United States Patent [19]

Oswald et al.

[11] Patent Number: 4,702,843
[45] Date of Patent: Oct. 27, 1987

[54] CONTROL SYSTEM FOR AN ADVERSE TERRAIN VEHICLE

[75] Inventors: Norman D. Oswald, Duncanville; Harry S. Mankey, Dallas; Carl M. Franklin, Midlothian; James M. Wilhelm, Arlington; Ronnie M. Osborn, Big Spring, all of Tex.

[73] Assignee: Standard Manufacturing Co., Inc., Dallas, Tex.

[21] Appl. No.: 747,669

[22] Filed: Jun. 21, 1985

[51] Int. Cl.[4] .............................................. B60G 11/26
[52] U.S. Cl. .................................... 280/707; 180/6.48; 180/24.07
[58] Field of Search .............................. 280/707, 702; 180/24.06, 24.07, 209, 307, 308, 6.48; 152/415, 416, 417, 427

[56] References Cited

U.S. PATENT DOCUMENTS

| | | | |
|---|---|---|---|
| 1,836,446 | 12/1931 | Christie | 180/9.21 |
| 1,858,784 | 5/1932 | Masury | 180/72 |
| 1,902,712 | 3/1933 | Leipert | 180/24.11 |
| 1,938,498 | 12/1933 | Porcello | 280/124 |
| 1,938,847 | 12/1933 | Masury | 180/72 |
| 2,024,199 | 12/1935 | Barnes | 180/72 |
| 2,044,306 | 6/1936 | Kegresse | 180/6.54 |
| 2,091,509 | 8/1937 | Kramer | 180/72 |
| 2,269,728 | 1/1942 | Mills | 280/124 |
| 2,299,006 | 10/1942 | Brown | 180/22 |
| 2,319,978 | 5/1943 | Collender | 280/80 |
| 2,361,496 | 10/1944 | Pointer | 180/24.02 |
| 3,105,700 | 10/1963 | Hardman | 280/104.5 |
| 3,165,331 | 1/1965 | Hardman | 280/104 |
| 3,276,502 | 10/1966 | Ruf | 152/417 |
| 3,299,978 | 1/1967 | Sponsler | 180/9.52 |
| 3,304,097 | 2/1967 | Lewis | 280/104.5 |
| 3,372,766 | 3/1968 | Lifferth | 180/7 |
| 3,452,702 | 7/1969 | Slemmons | 180/24.07 |
| 3,566,825 | 3/1971 | Ruf | 115/1 |
| 3,656,672 | 3/1971 | Mercier | 180/21 |
| 3,805,912 | 4/1974 | Mattson | 180/118 |
| 3,809,004 | 5/1974 | Leonheart | 115/1 |
| 3,930,550 | 1/1976 | Rose | 180/24.08 |
| 4,023,637 | 5/1977 | Jackovich | 180/6.48 |
| 4,040,254 | 8/1977 | Knapp et al. | 180/6.48 |
| 4,056,158 | 11/1977 | Ross | 180/6.48 |
| 4,154,279 | 5/1979 | Tsuruta | 152/416 |
| 4,285,627 | 8/1981 | Oswald | 414/695.5 |
| 4,298,047 | 11/1981 | Bobard | 152/417 |

(List continued on next page.)

FOREIGN PATENT DOCUMENTS 2146723 3/1973 Fed. Rep. of Germany .
169000 11/1965 U.S.S.R. .

Primary Examiner—John J. Love
Assistant Examiner—Ross Weaver
Attorney, Agent, or Firm—Michael A. O'Neil

[57] ABSTRACT

An adverse terrain vehicle is provided which includes a system for controlling a number of vehicular functions. The vehicle includes at least two variable displacement hydraulic motors, each for driving at least one wheel member on one side of the vehicle independently of the wheel members on the opposing side thereof. At least two variable displacement hydraulic pumps are mounted on the vehicle for supplying pressurized hydraulic fluid to the hydraulic motor on one side of the vehicle independently of the hydraulic motor on the opposing side thereof. The hydraulic pumps are driven by an engine. A sensor detects a decrease in the power output of the vehicle below that selected by the vehicle operator. Overload protection circuitry is responsive to the overload sensor and adjusts the displacement of the hydraulic motors and pumps to increase the power output capacity of the vehicle. Braking control circuitry coordinates with braking of the vehicle steering to effect turning of the vehicle while braking. Control circuitry also adjusts the vertical positions of the wheels on opposing sides of the vehicle during a turn to facilitate skid-steering. Control circuitry also varies the displacement of the hydraulic motors to prevent their operation at excessive speeds and to facilitate acceleration of the vehicle at slow speeds. A tire inflation system is utilized to control the pressure within the tires of the vehicle.

22 Claims, 25 Drawing Figures

U.S. PATENT DOCUMENTS

| | | | |
|---|---|---|---|
| 4,310,078 | 1/1982 | Shore | 180/6.48 |
| 4,310,173 | 1/1982 | Varady | 280/704 |
| 4,313,488 | 2/1982 | Brockmann | 152/416 |
| 4,315,631 | 2/1982 | Rainville | 280/6 H |
| 4,325,443 | 4/1982 | Fischer | 180/6.54 |
| 4,418,737 | 12/1983 | Goodell | 152/416 |
| 4,421,151 | 12/1983 | Stumpe | 152/417 |
| 4,431,043 | 2/1984 | Goodell et al. | 152/417 |
| 4,434,833 | 3/1984 | Swanson | 152/417 |
| 4,454,925 | 6/1984 | Oswald | 180/22 |
| 4,470,506 | 9/1984 | Goodell | 206/223 |
| 4,498,515 | 2/1985 | Holtzhauser et al. | 152/417 |
| 4,595,069 | 6/1986 | Oswald | 180/24.02 |
| 4,600,069 | 7/1986 | Oswald | 180/24.02 |

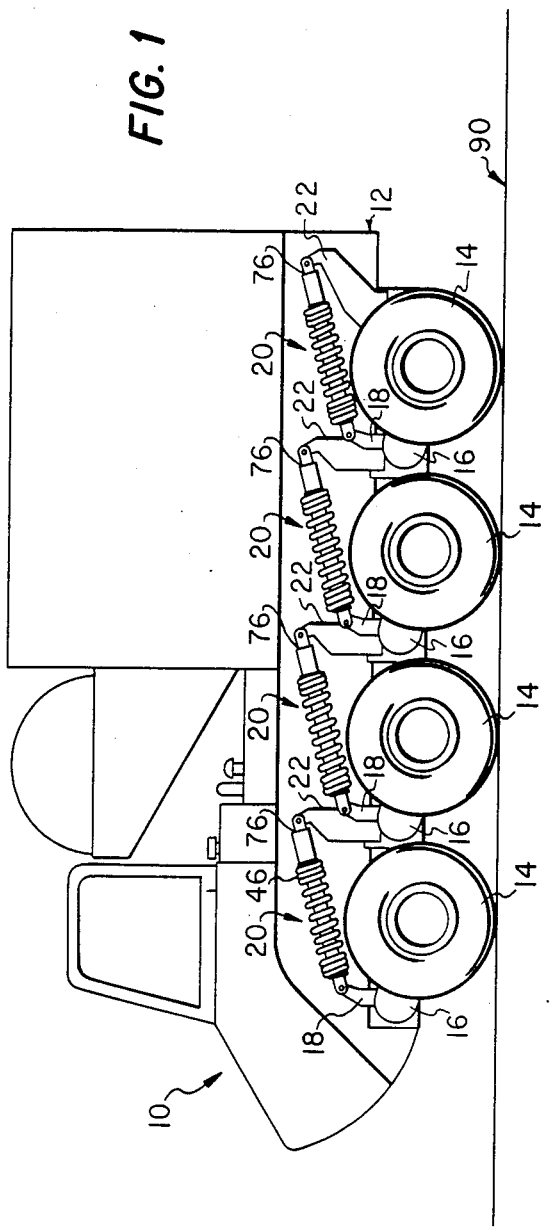
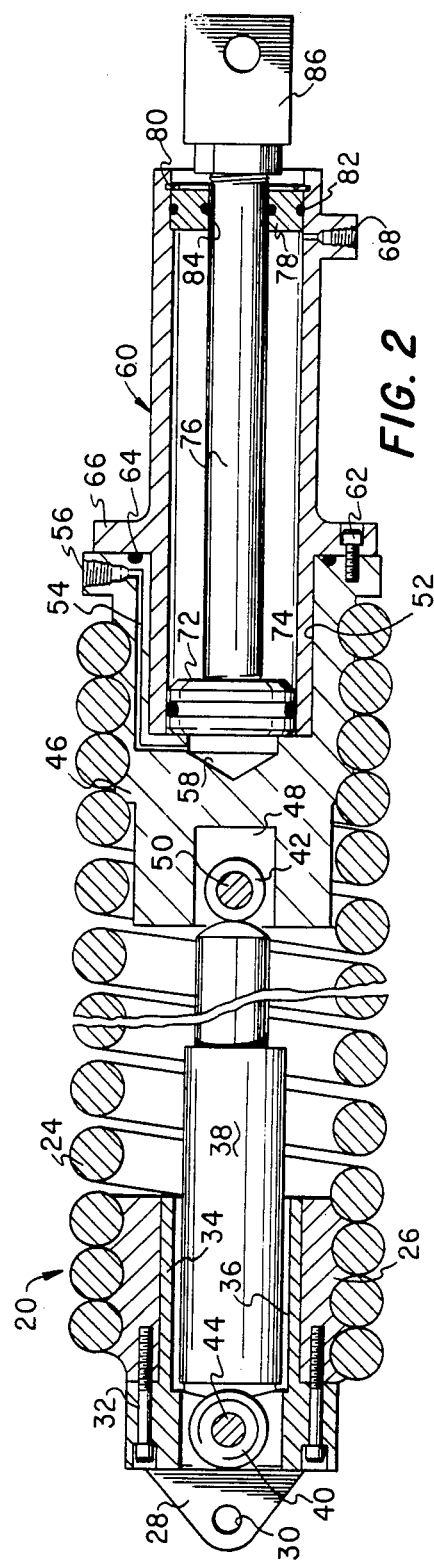
FIG. 1
FIG. 2

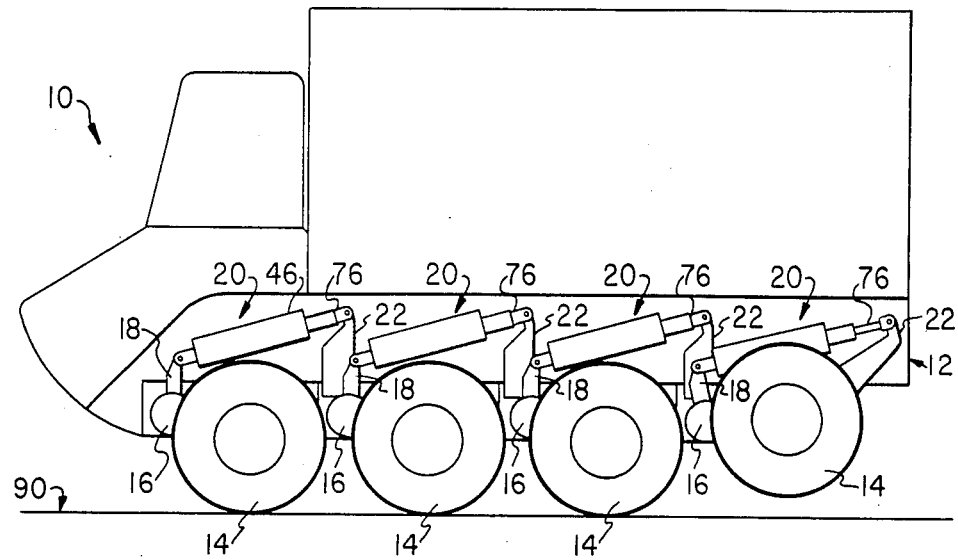
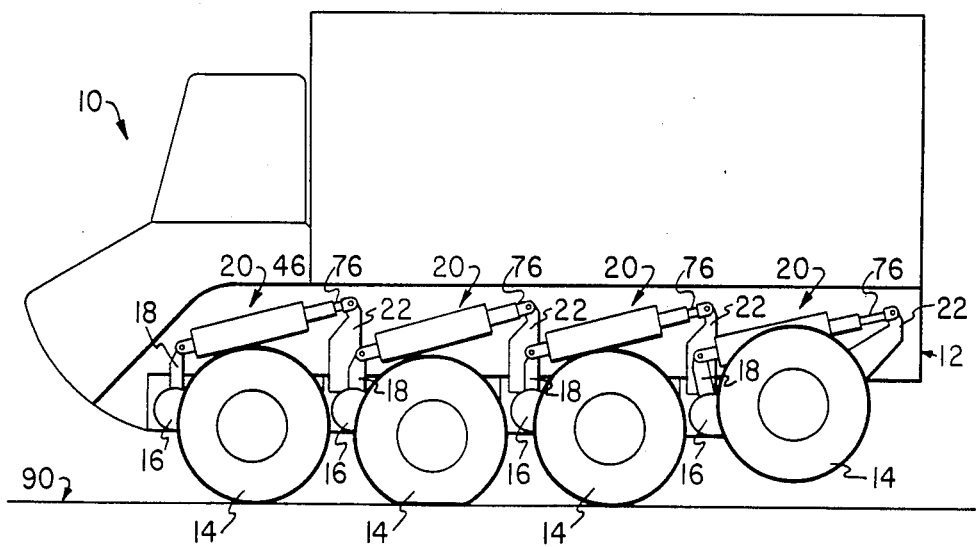

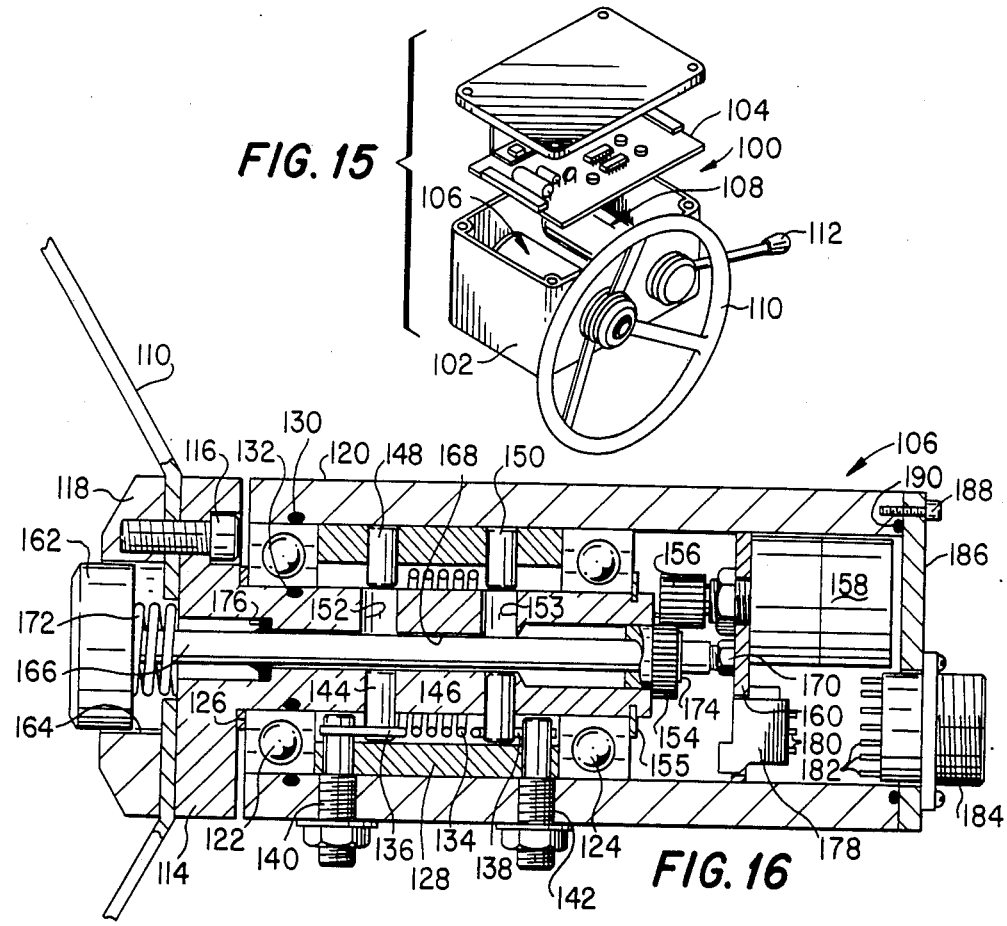
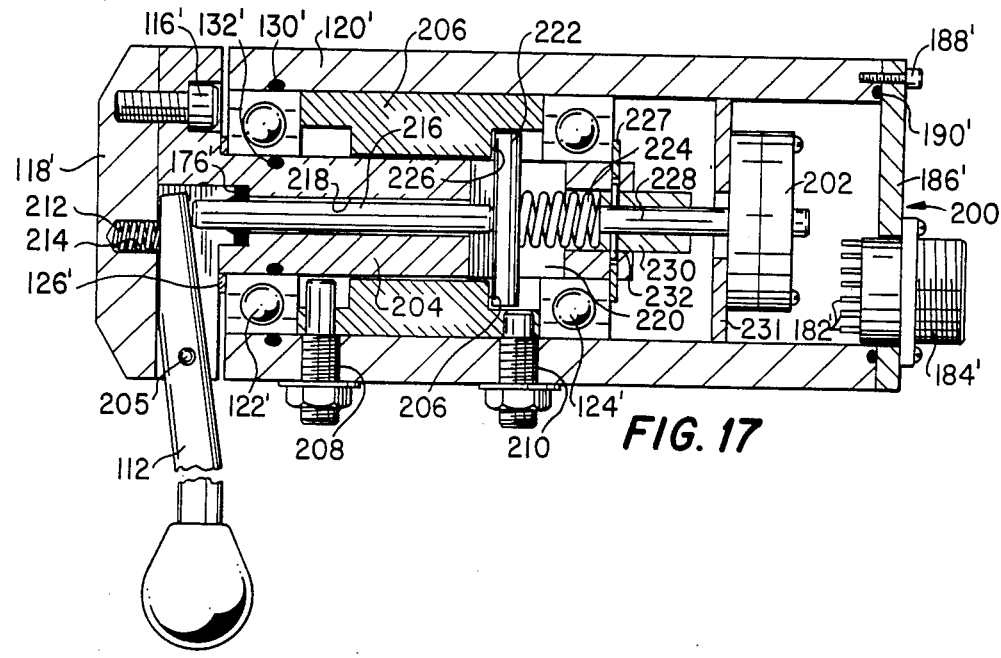

CONTROL SYSTEM FOR AN ADVERSE TERRAIN VEHICLE

TECHNICAL FIELD

This invention relates to an automated control system for adverse terrain vehicles, and more particularly, to a system which controls and coordinates one or more of the power output, steering, braking and suspension functions of the vehicle to enhance vehicle performance.

BACKGROUND AND SUMMARY

Various types of vehicles have been developed for transporting personnel, cargo, weapons and other materials over adverse terrain. The overwhelming majority of adverse terrain vehicles have three or more wheel members mounted on each side and are either fitted with pneumatic tires or with a track circumscribing the wheel members. The use of such an arrangement of wheel members offers support to the vehicle at a number of locations along its length, thereby reducing the effect of terrain irregularities, resulting in a smoother ride and increased vehicle stability.

Due to steering limitations imposed by use of three or more wheel members on each side, such adverse terrain vehicles are usually directed along their path of travel by means of skid-steering, whereby the speed of the wheel members positioned on the inside of a selected turn is reduced below the speed of the wheels positioned on the outside of the selected turn to impose a moment on the vehicle in the direction of the selected turn. The imposed moment directs the vehicle into a turn, causing the wheel members to more laterally across the underlying surfaces in varying degrees, depending upon the radius of the turn and the position of the wheel members along the vehicle frame.

In order to facilitate skid-steering, adverse terrain vehicles are typically equipped with a hydrostatic drive system which allows the wheel members of each side of the vehicle to be driven independently of the wheel members on the opposite side of the vehicle. Hydrostatically driven vehicles commonly include at least one engine, or other prime mover, which drives a hydraulic pump on each side of the vehicle. The pumps, in turn, are connected by hydraulic lines to at least one hydraulic motor mounted on each side of the vehicle. The hydraulic motors are generally connected to the wheel members on their respective sides of the vehicle by a mechanical transmission.

During operation, the hydraulic motors drive the wheel members mounted on their respective sides of the vehicle in response to pressurized hydraulic fluid supplied from their associated hydraulic pump through the interconnecting hydraulic lines. Variation in the speed of the wheel members on each side of the vehicle to adjust the velocity of the vehicle and to turn the vehicle is accomplished by varying the displacement of the pumps associated with the wheel members of each side of the vehicle, thereby increasing or decreasing the flow of hydraulic fluid to the motors as is desired. Alternatively, skid-steering of adverse terrain vehicles has been accomplished by applying a braking force to the wheel members positioned on one side of the vehicle, causing the vehicle to turn toward the side in which the braking force is applied.

The operation of conventional adverse terrain vehicles is complicated by the use of such dual braking and drive systems to control the speed and direction of movement of the vehicle. For example, the controls for operation of such vehicles ordinarily include a pair of levers each positionable in front of or behind a neutral position to control the drive and braking systems of one side of the vehicle. For example, forward displacement of a particular lever will increase the output of the hydrostatic drive system of one side of the vehicle, while displacement of the control lever behind the neutral position imposes a braking force on the associated wheel members. Efficient and coordinated control of the steering, braking and velocity of vehicles incorporating such dual controls is often difficult or impossible in extreme situations, such as over very rough terrain and at high speeds, when the risk of damage to equipment and personnel is greatest. In addition, operation of such controls requires the use of both hands of the operator, requiring a second operator, or co-pilot, to control other vehicle functions. Further, the use of such controls requires substantial training due to the dissimilarity from the familiar controls of an automobile.

In addition to difficulties associated with control of velocity and direction of movement, adverse terrain vehicles incorporating hydrostatic drive systems are incapable of satisfactory operation under extreme load conditions, such as when climbing steep grades. In such situations, the load imposed on the prime mover or engine driving the hydraulic pumps of the vehicle increases to the point that the operator must slow the vehicle to a crawl to transverse the hill without stalling the engine. This increases the time required to climb the grade and also causes difficulty in steering the vehicle due to the increase load caused by skid-steering at lower speeds.

The present invention comprises an adverse terrain vehicle including a system for automatically controlling and coordinating a combination of the steering, braking, power output and suspension functions of a vehicle in response to operator commands. The vehicle includes at least two hydrostatic drive systems, each for driving the wheel members on one side of the vehicle independently of the wheel members on the opposing side of the vehicle. The control system includes steering means for directing the vehicle along a path selected by the operator by adjusting the speed of the hydrostatic drive on either side of the vehicle to effect turning of the vehicle. The control system may also include braking means responsive to the commands of the operator input through the steering means for selectively applying braking forces to the wheel members on each side of the vehicle to slow the vehicle, while simultaneously turning the vehicle as directed by the operator.

One aspect of the invention relates to enhancement of the operation of each hydrostatic drive system, which preferably includes a variable displacement hydraulic motor for driving at least one wheel member on each side of the vehicle. Each hydraulic motor, in turn, is driven by pressurized hydraulic fluid supplied by a variable displacement hydraulic pump. The hydraulic pumps of the hydrostatic drive system are driven by at least one prime mover. The control system includes sensing means for sensing a decrease in the power output of the vehicle below a level selected by the operator. In response thereto, an overload protection means is provided for increasing the displacement of the hydraulic motors and decreasing the displacement of the hydraulic pumps in order to increase power output capacity of the vehicle.

The present invention further includes means for sensing the speed of the hydraulic motors on each side of the vehicle. Motor control means responsive to the motor speed sensing means are provided for varying the displacement of the hydraulic motor on each side of the vehicle as the motor speed exceeds a predetermined value and as the motor speed drops below a lower predetermined value. Specifically, the motor control means may be utilized to increase the displacement of the hydraulic motors as they reach the higher speeds to keep the motors within a safe operating speed and to increase the displacement of the hydraulic motors at slower speeds to facilitate acceleration of the vehicle.

In yet another aspect of the invention, the control system includes means responsive to the steering means for adjusting the displacement of at least one of the hydraulic pumps to effect turning of the vehicle when the vehicle is slowing or coasting. This feature of the invention facilitates steering of the vehicle by maintaining sufficient power output to effect a vehicle turn at virtually any speed, regardless of the power output directed by the vehicle operator.

In still another aspect of the invention, the control system includes wheel member positioning means for varying the vertical positioning of the wheel members of the vehicle in response to direction of a vehicle turn by the steering means to facilitate skid steering.

In another aspect of the invention, a tire inflation control system is provided for varying the pressure within the tires of the vehicle while the vehicle is operating.

BRIEF DESCRIPTION OF THE DRAWINGS

A more complete understanding of the invention may be had by reference to the following Detailed Description when taken in conjunction with the accompanying Drawings, wherein:

FIG. 1 is a side view of an adverse terrain vehicle incorporating the present invention;

FIG. 2 is an enlarged sectional view illustrating the suspension assembly of the vehicle shown in FIG. 1;

FIGS. 3, 4, 5, 6, 7, 8 and 9 are side views of the vehicle of FIG. 1 illustrating various arrangements of the positioning of the wheel members of the vehicle;

FIG. 15 is an exploded perspective view of the control housing and associated steering and drive selector controls of the vehicle of FIG. 1;

FIG. 16 is a sectional view illustrating the construction of the steering control module of the vehicle;

FIG. 17 is a sectional view illustrating the construction of the drive selector module of the vehicle;

FIG. 21b is a continuation of the upper level schematic diagram of the control system of FIG. 19a;

DETAILED DESCRIPTION

Figure 5:
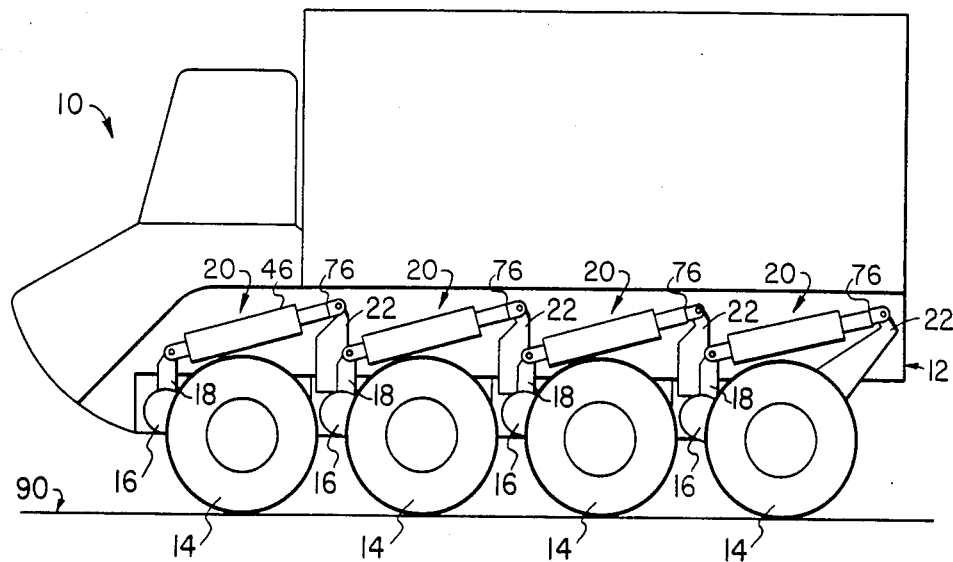

Referring now to the Drawings, and particularly to FIG. 1 thereof, there is shown an adverse terrain vehicle 10 incorporating the present invention. The vehicle 10 is shown carrying various weapons detection apparatus, including radar and other accessories and equipment as may be required. The vehicle 10 includes a prime mover (not shown) which may comprise a carburetor/ignition engine, a diesel engine, a gas turbine, etc. The prime mover, in turn, drives at least two pumps which are each mounted within the vehicle and associated with opposing sides thereof. The hydraulic pumps each supply pressurized hydraulic fluid to at least one hydraulic motor for driving one or more of the wheel members mounted on that side of the vehicle. Any number of suitable transmissions may be utilized, such as a chain and sprocket drive, for driving at least one wheel member on each side of the vehicle. Preferably, the hydraulic motors and pumps utilized in the vehicle have variable displacements, thereby affording a wide range of control over the operating speed and power output of the pumps and motors during operation of the vehicle.

Wheel members 14 of the vehicle 10 are each mounted on a primary frame 12 by a secondary frame 16. The secondary frames 16 are each pivotally mounted to the primary frame 12 of the vehicle 10, thereby allowing vertical movement of each of the wheel members 14 with respect to the frame 12. The wheel members 14 preferably comprise elastomeric tires, although other types of wheels and/or tires may be utilized in the practice of the invention if desired. Although the embodiment illustrated in FIG. 1 includes four wheel members 14 mounted on each side of the vehicle 10 and each supported by a secondary frame 16 for vertical movement with respect to the primary frame 12, it will be understood that the precise number of secondary frames and wheel members utilized is not critical to the practice of the invention. Accordingly, many aspects of the invention may be incorporated with vehicles having as few as two wheel members and as many as five or more wheel members mounted on each side thereof.

Each secondary frame 16 has a bracket 18 secured thereto. A suspension assembly 20 is connected between each bracket 18 and a corresponding bracket 22 secured to the primary frame 12. The construction of each of the suspension assemblies 20 is illustrated in more detail in FIG. 2. Each suspension assembly 20 includes an elongate coil spring 24. A first end member 26 is threadedly engaged with one end of the spring 24. An attachment bracket 28, having an attachment aperture 30 formed therein, is secured to the end member 26 by fasteners 32. The bracket 28 includes a tubular portion 34 which extends through the end member 26 to define a shock absorber receiving passageway 36.

A shock absorber 38 is positioned within the coil spring 24. The shock absorber 38 may comprise any of the various types conventionally used in automotive and similar applications, and is provided with conventional attachment apparatus 40 and 42 located at the opposite ends thereof. A pin 44 is received through the attachment apparatus of the shock absorber 38 and through aligned apertures formed in the bracket 28 to secure the shock absorber 38 to the bracket 28. This in turn secures one end of the shock absorber 38 to the end member 26 and ultimately to the end of the coil spring 24 threadedly engaged therewith.

An end member 46 is threadedly engaged with the opposite end of the spring 24. The end member 46 is provided with a blind passageway 48 which receives the attachment apparatus 42 of the shock absorber 38. A pin 50 is received through the attachment apparatus 42 and through aligned apertures formed in the end member 46 to secure the shock absorber 38 to the end member 46 and ultimately to the end of the coil spring 24 threadedly engaged therewith.

The end member 46 is further provided with a hydraulic cylinder receiving aperture 52. A hydraulic passageway 54 extends from a port 56 to a reduced end portion 58 of the aperture 52. A hydraulic cylinder 60 is received in the aperture 52 and is secured therein by means of fasteners 62. An O-ring seal 64 is provided between a flange 66 of the hydraulic cylinder 60 and the adjacent end surface of the end member 46.

The hydraulic cylinder 60 is open at one end and thereby communicates with the port 56 through the passageway 54 and the reduced end portion 58 of the aperture 52. A port 68 is provided at the opposite end of the hydraulic cylinder 60 and communicates with the interior thereof through a passageway 70. A piston 72 is located within the hydraulic cylinder 60 for reciprocation therein under the action of pressurized hydraulic fluid received either through the port 56 or through the port 68. The piston 72 is provided with an O-ring seal 74.

A piston rod 76 extends from the piston 72 through an end plate 78 which is secured in the hydraulic cylinder 60 by a snap ring 80. O-ring seals 82 and 84 are provided between the end plate 78 and the hydraulic cylinder 60 and between the end plate 78 and the piston rod 76, respectively. A bracket 86 is mounted on the piston rod 76 and is provided with an attachment aperture 88.

Referring now to FIGS. 1 and 2, the suspension assembly 20 provides a spring/shock absorber suspension which may be adjusted in length. Specifically, when the assembly 20 is mounted as shown in FIG. 1 between the brackets 18 and 22, the spring 24 is placed in tension between the end members 26 and 46 of the assembly. The tensile force of each spring 24 is applied to the bracket 18 of the associated secondary frame 16 of the vehicle 10 to urge the respective wheel member 14 downwardly from the primary frame 12 against the underlying surface, thereby supporting the vehicle. The shock absorber 38 is mounted within and is parallel with the spring 24 to dampen oscillations of the wheel member 14 associated therewith. The distance between the end member 46 of each assembly 20 and its respective bracket 22 on the vehicle 10 is variable by extending and retracting the piston rod 76 of the assembly 20.

Extension and retraction of the piston rod 76 of the hydraulic cylinder 60 of each assembly 20 may be utilized to vary the height of the primary frame 12 above the underlying surface 90 and/or to vary the load supported by the particular wheel member 14 associated therewith. For example, extension of the piston rods 76 of each of the assemblies 20 of vehicle 10 simultaneously allows the bracket 18 attached to each assembly 20 to be displaced from the corresponding bracket 22 mounted on the primary frame 12. This results in counterclockwise pivotting of the secondary frame 16 (FIG. 1), resulting in lowering of the primary frame 12 toward the underlying surface 90. It will be understood that the clearance between the primary frame 12 on each side of the vehicle 10 may be varied in this manner to tilt the vehicle laterally while positioning the center line of the vehicle at a desired height above the underlying surface 90.

Individual variation of the distance between the end member 46 of a particular suspension assembly 20 and the associated bracket 22 on the primary frame 12 with respect to one or more of the remaining assemblies 20 on the same side of the vehicle 10 will effect a variation in the load supported by the associated wheel member 14. For example, extension of the piston rod 76 of the front-most suspension assembly 20 of the vehicle 10 will effect a reduction in the tension of the spring 24 of the assembly 20 and a corresponding reduction in the load supported by the front wheel member 14. This technique allows the load supported by each of the wheel members 14 on each side of the vehicle to be varied to optimize the maneuverability, stability and ride of the vehicle 10 throughout a wide variety of applications.

Variation of the vertical height of the vehicle 10 and the load supported by each of the wheel members 14 of the vehicle 10 to enhance vehicular performance is provided by coordinating the positioning of the piston rods 76 of each assembly 20 with the steering control system of the vehicle 10. Variation of the position of a load supported by the wheel members 14 depends upon which of a number of primary and secondary control modes are selected by the vehicle operator. The primary control modes include Normal, City and Select and may be selected by means of a three position rotary switch mounted on the instrument panel (not shown) of the vehicle 10. A number of secondary control functions are enabled only when the primary control mode is in the Normal and Select positions. Specifically, the secondary control mode of Loaded and Unloaded are enabled in the Normal primary mode, while the secondary control modes of Tilt Left/Right, Tilt Fore/Aft and Raise/Lower are enabled in the Select primary mode. In addition, selection of the Select mode allows each of the suspension asemblies 20 of the vehicle 10 to be operated independently to adjust the position and load of each of the wheel members 14 by means of toggle switches mounted on the control panel.

FIGS. 3, 4, 5 and 6 illustrate operation of the vehicle 10 when the operator has selected the Normal primary operating mode. More specifically, FIGS. 3 and 4 illustrate operation of the vehicle 10 in the Normal primary mode when the Unloaded secondary operating mode is selected by the operator. This selection combination fully extends the piston rods 76 of the rear-most suspension assemblies 20. Full extension of the piston rods 76 completely compresses the shock absorber 38 within the assemblies 20 causing the secondary frame 16 to lift the rear-most wheel members 14 from the underlying surface 90. This positioning of the rear-most wheel members 14 on both sides of the vehicle 10 shifts support of the vehicle 10 forward to correspond more closely with the center gravity of the unloaded vehicle.

The wheel member positioning control means responds to the steering control of the vehicle 10 when the Normal primary operating mode is selected to selectively position the piston rods 76 of the suspension assemblies 20 to facilitate skid-steering of the vehicle 10. For example, FIG. 3 illustrates operation of the vehicle 10 when the steering control directs the vehicle along a straight forward path. In this mode of operation, the piston rods 76 of the suspension assemblies 20 are in substantially the same position, thereby placing substantially equivalent loads on the wheel members 14 contacting the underlying surface 90. Although the piston rods 76 in FIG. 3 are shown fully retracted, they may be positioned throughout their range of movement to vary the height of the vehicle 10.

FIG. 4 illustrates positioning of the piston rods 76 of the suspension assemblies 20 when the steering controls of vehicle 10 directs a turn. In this situation, the piston rods 76 of the first and third suspension assemblies 20 on each side of the vehicle 10 are extended to reduce the load supported by their corresponding wheel members 14. In this configuration, the second wheel members 14 on each side of the vehicle 10, which are the centermost wheel members contacting the underlying surface 90, support a substantially greater share of the vehicle load than do the remaining wheel members 14 contacting the underlying surface 90. Unloading of the first and third wheel members 14 on each side of the vehicle 10 facilitates skid-steering by reducing the resistance to lateral movement of the first and third wheel members 14 over the underlying surface 90 as the vehicle 10 rotates about a centrally located vertical axis. Upon completion of a vehicle turn, the load supported by the first and third wheel members 14 on each side of the vehicle 10 is increased as their associated piston rods 76 are returned by the wheel member positioning control means to the position illustrated in FIG. 3.

Figure 6:
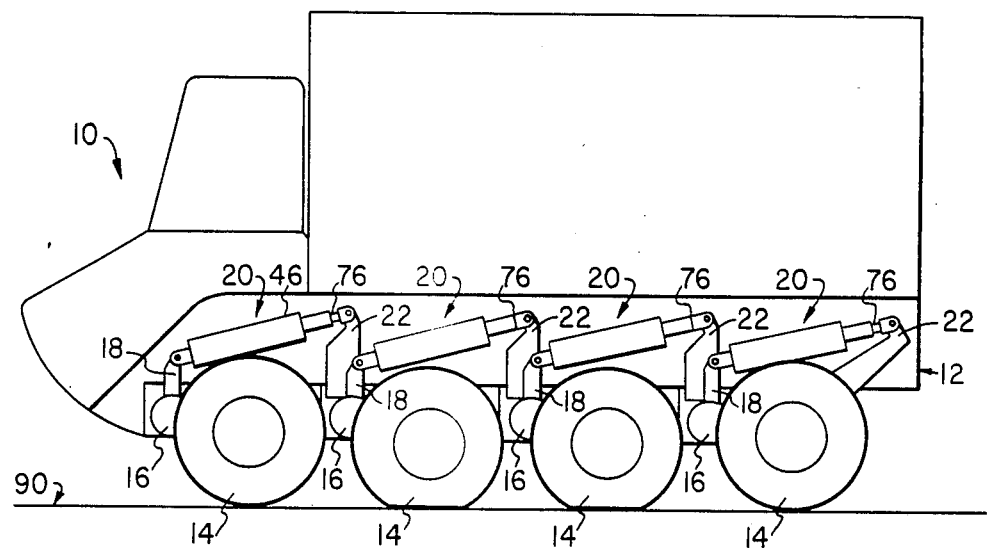

FIGS. 5 and 6 illustrate operation of the vehicle 10 with the wheel member positioning means in the Normal primary operating mode and in the Loaded secondary operating mode. This selection of primary and secondary operating modes places the piston rods 76 of all of the suspension assemblies 20 in substantially the same position, thereby substantially equalizing the load supported by the wheel members 14 on both sides of the vehicle 10. It should be noted that such loading of the wheel members 14 compensates for a rearward shift in the center gravity of the vehicle when it is loaded.

The wheel member positioning control means is also responsive to the steering control of the vehicle 10 when the Normal primary operating mode and the Loaded secondary operating mode are selected. FIG. 5 illustrates loading of the wheel members 14 when the steering control directs the vehicle 10 along a straight forward path, wherein substantially equivalent loads are placed on all of the wheel members 14. Once a turn is directed by the steering control, the wheel member positioning means extends the piston rods 76 of the first and fourth suspension assemblies 20 on each side of the vehicle 10 to reduce the load supported by the end-most wheel members 14. Such loading of the wheel members 14 facilitates skid-steering of the vehicle 10 in a manner similar to that previously discussed with reference to FIG. 4. Upon completion of the vehicle 10 turn, the wheel member positioning means returns the piston rods 76 of the end-most suspension assemblies 20 to the position shown in FIG. 5, thereby increasing the load supported by the first and fourth wheel members and increasing stability of the vehicle 10. It will be apparent that the wheel member positioning control means may be operated with the piston rods 76 positioned at virtually at any point between their full extension and retraction to vary the height of the vehicle 10.

Operation of the vehicle 10 with the wheel positioning control means in the City primary operating mode is also illustrated in FIG. 6. As previously discussed, the piston rods 76 of the end-most suspension assemblies 20 are extended to reduce the load supported by the first and fourth wheel members 14 on each side of the vehicle 10, thereby facilitating skid-steering of the vehicle. The City primary operating mode is preferably selected for use of the vehicle 10 over paved roads or otherwise moderate terrain which do not significantly affect vehicle stability. The piston rods 76 of the suspension assemblies 20 therefore remain in the position shown in FIG. 6 during operation of the vehicle 10 in the City primary operating mode and are not actuated in response to the steering control.

The third of the primary operating modes of the wheel member positioning control means is the Select mode. This mode essentially enables a variety of secondary operating modes to be utilized by the vehicle operator, including tilting of the vehicle 10, raising and lowering the vehicle 10, and individual operation of each suspension assembly 20. Specifically, selection of the Select primary operating mode enables operation of a tilt control located on the control panel of the vehicle 10. The tilt control includes a toggle switch for controlling the tilting of the vehicle laterally and a toggle switch for controlling tilting of the vehicle fore and aft.

Figure 7:
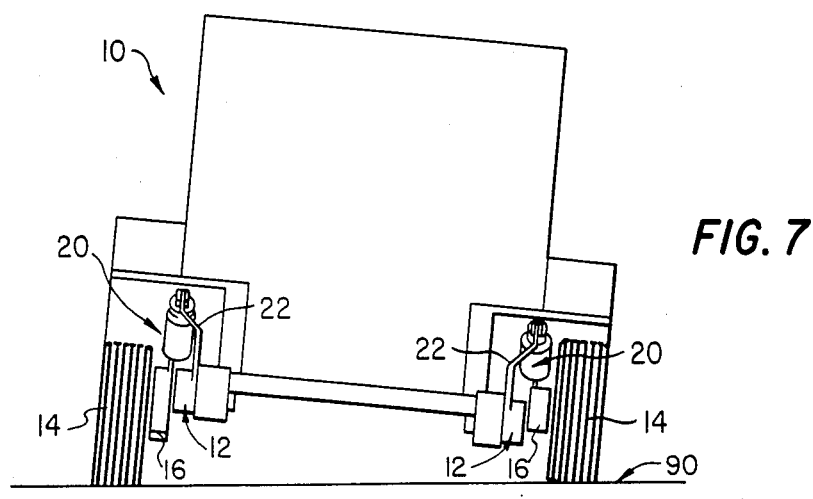

FIG. 7 illustrates use of the wheel member positioning means to laterally tilt the vehicle 10 toward the right. Such tilting is accomplished by displacement of the appropriate toggle switch on the vehicle control panel, causing the wheel member positioning control means to retract the piston rods of the suspension assemblies 20 on the left side of the vehicle and to extend the piston rods 76 of the suspension assemblies 20 on the right side of the vehicle. This results in displacement of the wheel members 14 on the left side of the vehicle away from the vehicle frame 12 and retraction of the wheel members 14 on the right side of the vehicle 10 towards the frame, thereby tilting the vehicle as shown in FIG. 7.

Actuation of each of the suspension assemblies 20 will continue at approximately the same rate from initiation of the tilt operation as long as the associated toggle switch is depressed or until all of the suspension assemblies 20 are fully extended and retracted on opposite sides of the vehicle 10. Therefore, if the wheel members 14 are positioned as shown in FIG. 3, following use of the vehicle 10 in the Normal primary operating mode, the tilt function will lower the rear-most wheel member 14 on the left side of the vehicle (shown fully raised) and will retract the three front-most wheel members 14 on the right side of the vehicle (not shown) until the corresponding suspension assemblies 20 reach their limit of actuation. It will be understood that the tilt operation may be accomplished in the same manner to return the vehicle 10 from the position shown in FIG. 7 to an upright position and to tilt the vehicle 10 from an upright position to the left. In both cases, the wheel members 14 on the left side of the vehicle 10 are extended and the wheel members 14 on the right side of the vehicle 10 are retracted.

Figure 8:
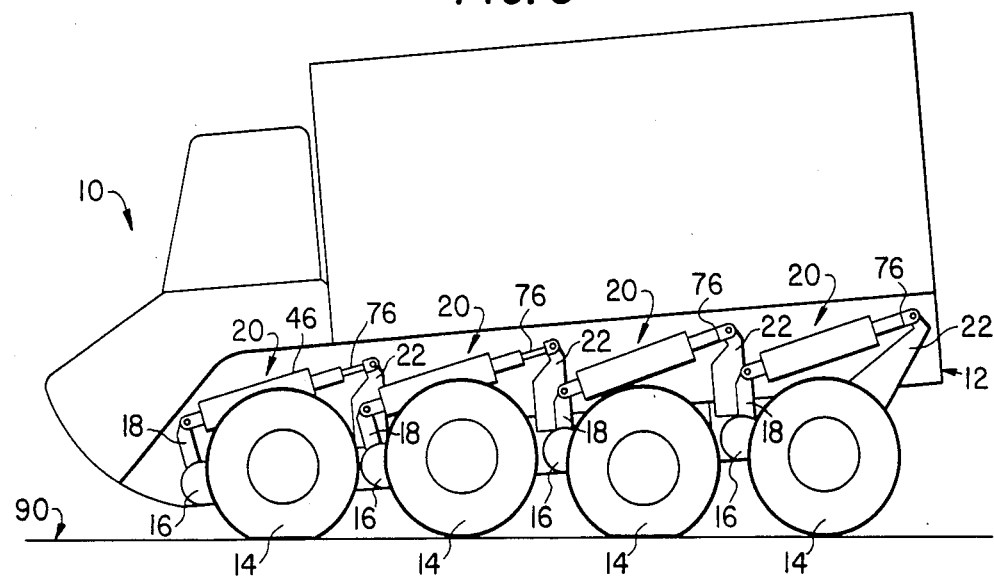
Figure 9:
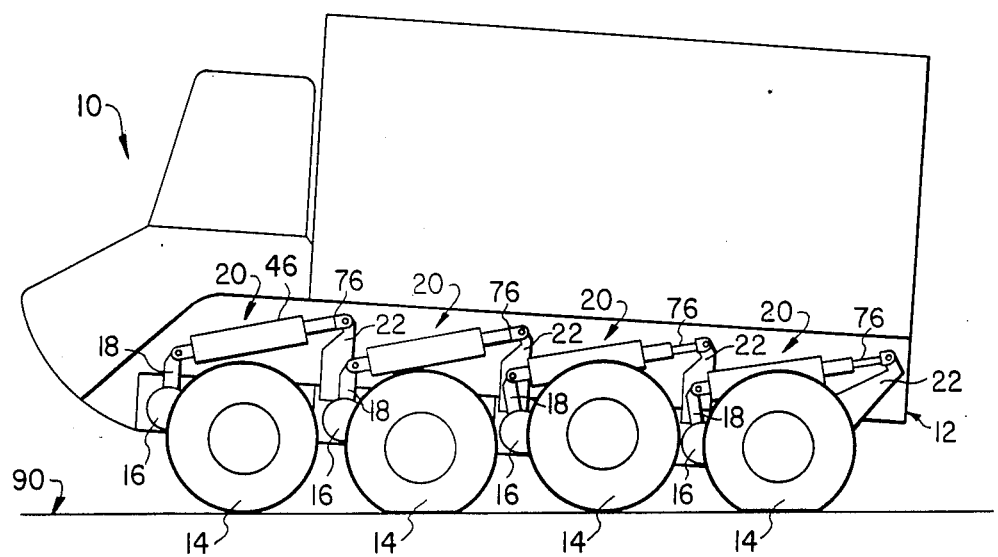

FIGS. 8 and 9 illustrate operation of the wheel member positioning control means to tilt the vehicle 10 forward and rearward, respectively. As shown in FIG. 8, tilting of the vehicle 10 forward is accomplished by actuation of the suspension assemblies 20 of the two front-most wheel members 14 to extend the piston rods 76 thereof, thereby retracting the first and second wheel members 14 on each side of the vehicle 10. The suspension assemblies 20 of the two rear-most wheel members 14 are concurrently actuated to retract their piston rods 76, thereby fully extending the third and fourth wheel members 14 on both sides of the vehicle 10. Such actuation of the suspension assemblies 20 continues at approximately the same rate for as long as the toggle switch initiating the tilt forward operation is depressed or until each of the suspension assemblies 20 reaches its limit of extension or retraction. As shown in FIG. 8, the first and third wheel members 14 of the vehicle 10 support the majority of the vehicle load when the vehicle 10 is tilted forward to its fullest extent.

FIG. 9 illustrates operation of the wheel member positioning control means to tilt the vehicle 10 backward. Depression of the appropriate toggle switch initiates retraction of the piston rods 76 of the two front-most suspension assemblies 20 on both sides of the vehicle 10 and initiates extension of the piston rods 76 of the two rear-most suspension assemblies 20 to extend and retract the front-most and rear-most wheel members 14, respectively, on both sides of the vehicle in a manner similar to the forward tilt operation previously discussed with respect to FIG. 8. Tilting of the vehicle 10 rearwardly continues while the toggle switch is depressed or until the piston rods 76 of the suspension assemblies 20 of the front-most wheel members 14 and the rear-most wheel members 14 are, respectively, fully retracted and fully extended. As shown in FIG. 9, the second and fourth wheel members 14 support the majority of the vehicle load when the vehicle 10 is tilted rearward to its fullest extent. The vehicle 10 may be returned from a forward or rearward tilt position to a horizontal position by operating the vehicle tilt function of the wheel member positioning control means in the opposite direction.

The wheel member positioning control means can be used to vary the height of the vehicle 10 when the Select primary operating mode and the Raise and Lower secondary operating mode is selected. This is accomplished by providing a toggle switch or other suitable control device on the instrument panel of the vehicle 10. Upon depression of the toggle switch to activate the raise function of the wheel member positioning control means, the piston rods 76 of all wheel members 14 are extended at an approximately equivalent rate until either the operator releases the toggle switch or the piston rods 76 are fully extended. Such extension of the piston rods 76 causes the wheel members 14 to be displaced downwardly from the primary frame 12 of the vehicle 10, thereby raising the vehicle 10. Conversely, the toggle switch may be depressed to activate the lowering function of the wheel member positioning control means. This extends the piston rods 76 of all of the suspension assemblies 20 of the vehicle 10, thereby retracting the wheel members 14 upwardly towards the primary frame 12 of the vehicle 10 and lowering the height of the vehicle 10. Such actuation of the piston rods 76 continues as long as the toggle switch remains depressed or until all of the piston rods 76 have been fully extended.

The Raise and Lower secondary operating mode of the wheel member positioning means may be utilized to vary the overall height of the vehicle 10 without interfering with the function of the Normal and City primary operating modes. This is accomplished by first adjusting the vehicle height as previously discussed and then placing the wheel member positioning control means in either of the Normal or City primary operating modes. Control of the wheel members 14 will then be accomplished as discussed with reference to FIGS. 3-7 while the vehicle 10 remains at the adjusted height.

Figure 12:
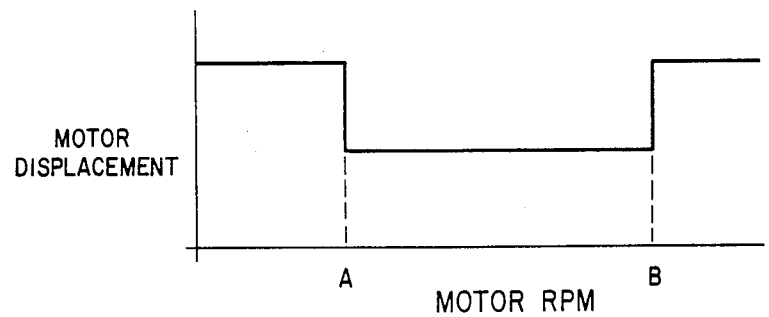
FIG. 12 is a graph illustrating certain aspects of the invention pertaining to control of the motor speed of the vehicle.
Figure 13:
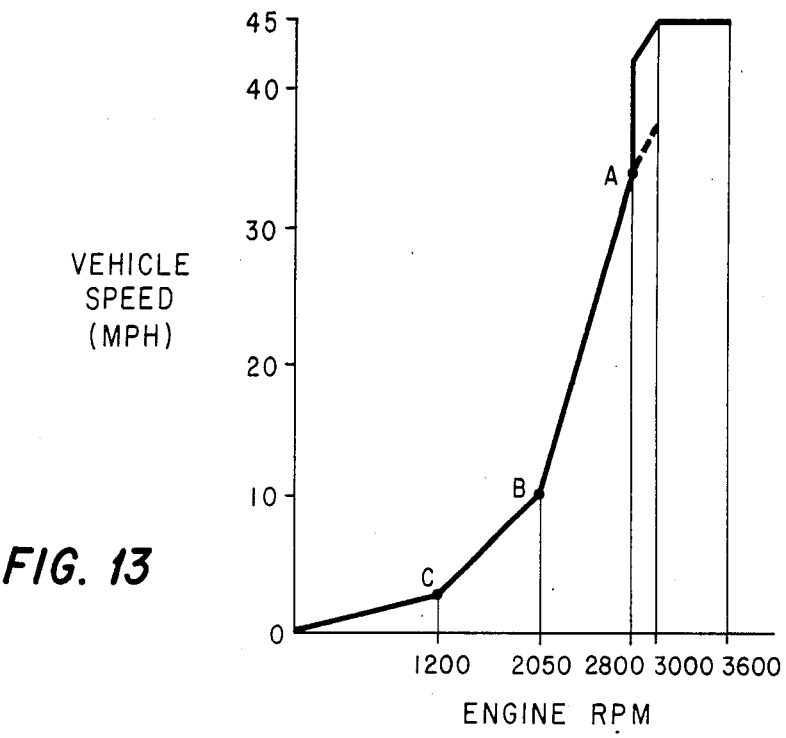
FIGS. 13 and 14 are graphs illustrating examples of the performance of a vehicle incorporating those aspects of the invention pertaining to control of the power output of the vehicle.
Figure 14:
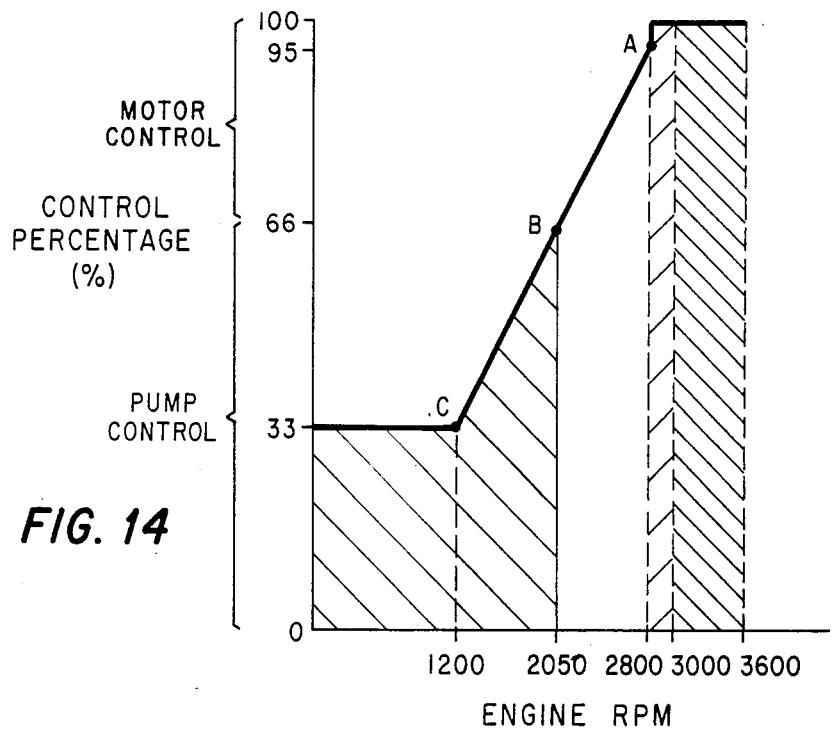

Another aspect of the present invention pertains to control and coordination of the steering, braking and power output of the vehicle 10 to enhance vehicle maneuverability and performance. More specifically, FIGS. 10 and 11 graphically illustrate the individual operation and coordination of the steering and braking functions, respectively, of the vehicle 10. FIGS. 12, 13 and 14 graphically illustrate control of the motor and pump displacements of the vehicle 10 to maximize power output and protection of the hydraulic motors from operation at a speed above a safe limit.

Figure 10:
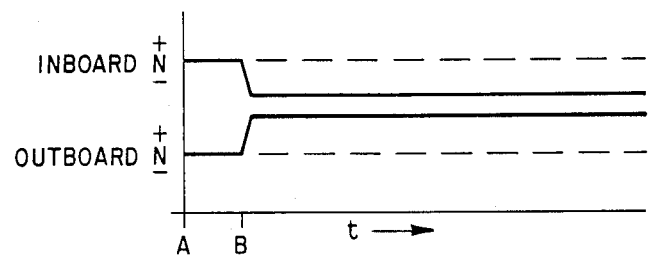
FIG. 10 is a graph illustrating certain aspects of the present invention pertaining to steering of the vehicle.

Referring now to FIG. 10, a graph illustrates the displacement on the hydraulic pumps driving the wheel members 14 of each side of the vehicle 10 in a typical vehicle turn. The vertical axis of the graph in FIG. 10 represents the normal displacement of the inboard and outboard pumps of the vehicle 10 when traveling along a straight forward path designated by the letter "N" and the broken lines adjacent thereto extending horizontally across the graph. During the time period between points A and B, the vehicle 10 is directed in a straight forward path, wherein the hydraulic pumps on each side of the vehicle are in an approximately equivalent displacement, driving the wheel members 14 on each side of the vehicle 10 at substantially the same speed. At time B, the operator initiates a vehicle turn, causing a reduction of the displacement of the hydraulic pump on the inboard side of the vehicle 10 an increase in the displacement of the hydraulic pump on the outboard side of the vehicle. This adjustment causes a corresponding reduction and increase in the speed of the hydraulic motors associated with the pumps. Thus, the varied displacement of the hydraulic pumps of the vehicle 10 reduce the speed of the inboard wheel members 14 and increase the speed of the outboard wheel members 14, causing skid-steering of the vehicle 10.

Figure 11:
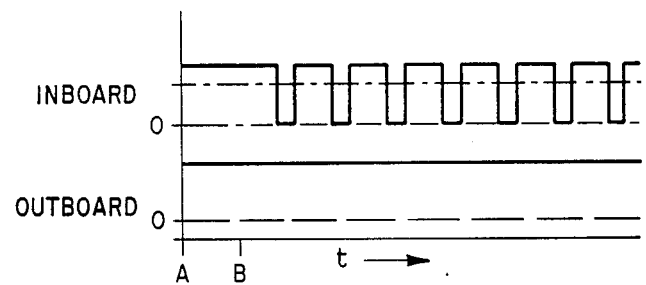
FIG. 11 is a graph illustrating certain aspects of the invention pertaining to control of vehicle braking.

Operation of the braking system of the vehicle 10 during a turn is graphically illustrated in FIG. 11. The vertical axis of the graph of FIG. 11 represents the braking force applied to at least one wheel member 14 on each side of the vehicle 10. Points zero along the vertical axis represent operation of the vehicle 10 with no braking forces applied to any wheel member 14 on the respective side of the vehicle 10 and are represented on the graph by horizontal broken lines. Continuous and consistent braking of the vehicle 10 when the vehicle 10 is directed along a straight forward path is illustrated between points A and B of the horizontal time axis (t).

In the example illustrated, a vehicle turn is initiated at point B, at which time the braking control means responds to the steering control means to reduce the braking forces applied to the wheel members 14 of the outboard side of the vehicle 10. This is accomplished by pulsing the braking force applied to the outboard wheel members 14 of the vehicle 10 as shown in FIG. 11. The pulses applied to the outboard wheel members 14 is sufficiently rapid that a lesser average effective braking force (indicated by the dot and dash line) is realized. The amplitude of the braking force pulses applied to the outboard wheel members 14 and the braking force applied to the inboard lwheel members 14 are maintained at substantially equivalent levels. Such coordinated operation of the braking control means and the steering control of the vehicle 10 increases vehicle maneuverability. The effective braking force applied to the outboard wheel members 14 is varied in response to the steering control means by decreasing and increasing the duration of the braking force pulses applied to the wheel members 14 as a smaller and larger turning radii, respectively, are directed by the vehicle operator. In summary, the steering control means and the braking control means operate in combination to control the displacement of the hydraulic pumps, as shown in FIG. 10 and the brakes of the vehicle 10, as shown in FIG. 11, to effect turning of the vehicle 10. Preferably, variation of the hydraulic pump displacement and variation of the braking forces applied to the inboard and outboard wheel members 14 in the manner previously discussed is in direct proportion to deflection of conventional braking and steering controls actuated by the vehicle operator either remotely or within the vehicle 10.

The vehicle 10 includes a hydraulic pump and motor control means which controls the displacement of the hydraulic pumps and motors of the vehicle 10 to enhance vehicle performance. FIG. 12 graphically illustrates operation of the pump and motor control means to adjust the displacement of the hydraulic motors of the vehicle 10 as a function of motor r.p.m. A tachometer or other suitable sensing device senses and transmits a signal to the pump and motor control means indicating the speed of each of the hydraulic motors of the hydrostatic drive system. At speeds below a lower set point A, the hydraulic motors are adjusted by the pump and motor control means to their maximum displacement, regardless of other input to the pump and motor control means. Such control of the hydraulic motors facilitates acceleration of the vehicle 10 at slower velocities by providing greater torque to the wheel members 14. In one embodiment, lower set point A corresponds to a motor speed of 1,100 r.p.m.; however, it will be apparent that other motor speeds may be preferable, depending upon the particular application.

The pump and motor control means also functions to protect the hydraulic motors of the hydrostatic drive from being damaged from operation at high speeds. As is shown in FIG. 12, this is accomplished by adjusting the hydraulic motors to their maximum displacements when the speed of the motors exceeds a selected upper set point B, as determined by tachometers or other suitable sensing devices. Such adjustment of the hydraulic motors of the vehicle 10 tends to reduce the speed of the motor or, at least, create hydraulic resistance to continued increase in the motor speed. This feature is particularly useful to limit or prevent excessive motor speed when the vehicle 10 descends a downhill grade. In one embodiment, the upper set point B corresponds to 3,700 r.p.m.; however, it will be apparent that the upper set point B is variable, depending upon the particular application. Displacement of the hydraulic motors at speeds between the lower set point A and the upper set point B by the pump and motor control means is in accordance with the following discussion. The displacement of the hydraulic motors between points A and B in FIG. 12 is shown constant for purposes of illustration.

During normal operation of the vehicle 10, the pump and motor control means varies the displacements of the pumps to afford steering control when the vehicle is coasting. This is accomplished by sensing the speed of the motors when the vehicle is coasting the adjusting the displacement of the pumps such that the motors are supplied with a flow of hydraulic fluid immediately below the level necessary to drive the motors. In response to direction of a turn by the steering control, the displacement of the pump to the outboard side of the vehicle 10 is increased and the displacement of the pump on the inboard side of the vehicle 10 is decreased. Such adjustments cause a corresponding variation in the motor speeds, resulting in a vehicle turn.

FIGS. 13 and 14 graphically illustrate the operation of the pump and motor control means to prevent overloading of the prime mover or engine of the vehicle 10. This aspect of the motor and pump control means enhances the performance of the vehicle 10 when the hydrostatic drive system is under extreme load conditions, such as when the vehicle 10 is climbing a steep grade. In this situation, the pump and motor control means senses the speed of the engine of the vehicle 10, by means of a tachometer or other suitable sensing device, and varies the displacement of the hydraulic pumps and motors in response to a drop in the engine speed to maintain the load imposed on the engine at a manageable level.

FIG. 13 is an example of the operation of the pump and motor control means showing velocity of the vehicle 10 versus the engine speed of the vehicle 10. FIG. 14 corresponds directly with the graph of FIG. 13, but shows variations of the displacement of the hydraulic pumps and motors versus engine speed of the vehicle 10. Both graphs illustrate performance of the vehicle 10 as the pump and motor control means senses a decrease in the engine speed as the vehicle load increases. Therefore, in operation, performance of the vehicle 10 passes through points A, B and then C of the performance curves of FIGS. 13 and 14.

The power output and corresponding speed of the vehicle 10 are varied by adjustment of the hydraulic pump and motor displacements by the pump and motor control means in response to actuation of an accelerator pedal, throttle or other suitable device by the vehicle operator. As shown by the vertical axis of the graph in FIG. 14, displacement of the accelerator pedal by the operator from 0 to 66 percent of only the range of movement normally effects adjustment of the displacement of the hydraulic pumps by the pump and motor control means. Specifically, displacement of the hydraulic pumps is increased from their minimum to their maximum adjustments in proportion to the displacement of the accelerator pedal along the initial $\frac{2}{3}$ of its range of movement. Similarly, the displacement of the hydraulic motors of the vehicle 10 are varied proportionately by the pump and motor control means in response to displacement of the accelerator pedal throughout the final 33 percent or $\frac{1}{3}$ of its range of movement. Accordingly, the hydraulic motors are adjusted from their maximum displacement to their minimum displacement in proportion to the displacement accelerator pedal by the operator along the final 33 percent or $\frac{1}{3}$ of its range of movement. It will be apparent, however, that adjustment of the displacement of the hydraulic motors is limited as previously discussed with reference to FIG. 12, in order to maximize acceleration of the vehicle 10 at slow speeds and to protect the hydraulic motors from excessive speeds. In addition, initial adjustment of the displacements of the hydraulic pumps and motors are directed by the vehicle operator is accomplished gradually over a 50 second period, or other selected period, to avoid overloading the engine of the vehicle 10. For example, upon full depression of the accelerator pedal of the vehicle 10 by the operator, the hydraulic pumps will gradually be adjusted to full displacement and the hydraulic motors will thereafter be gradually adjusted to minimum displacement, allowing the vehicle 10 to first gain speed.

In the example shown in FIGS. 13 and 14, the vehicle 10 is initially operated with the hydraulic pumps at full displacement and the hydraulic motors at minimum displacement in response to full depression of the accelerator pedal by the vehicle operator. In this condition, operation of the engine of vehicle 10 is normally between 2,800 and 3,000 r.p.m.; however, the engine speed may be increased to between 3,00 and 3,600 r.p.m. during combat or other extreme conditions. As the vehicle 10 encounters an uphill grade, the load imposed on the vehicle engine increases, thereby reducing the engine speed from 3,600 to 2,800 r.p.m. and reducing the velocity of the vehicle 10. Once the engine speed has reached the overload set point of 2,800 r.p.m., the pump and motor control means immediately increases the displacement of the hydraulic motors to point A in FIG. 14, which corresponds to 95 percent displacement of the accelerator pedal. This causes an immediate increase in the torque applied to the wheel members 14 of the vehicle 10 by the hydraulic motors, a reduction in the load imposed on the engine of the vehicle 10 and a corresponding reduction in the velocity of the vehicle 10 to point A in FIG. 13. It will be apparent that selection of the overload set point can be varied to accommodate differences in the particular hydrostatic drive point utilized in different applications of the vehicle 10.

If the engine speed continues to drop below the overload set point, the pump and motor control means will continue to linearly increase the displacement of the hydraulic motors between points A and B on FIG. 14. Continued reduction of the engine speed causes a corresponding reduction of the displacement of the hydraulic pumps linearly between points B and C in FIG. 14. At point C, the hydraulic pumps are at one-half of their maximum displacement, which corresponds to approximately one-third of full displacement of the accelerator pedal. The displacement of the hydraulic pumps will not be reduced below one-half of their maximum displacement. Since the motor and pump control means adjusts the displacement of the hydraulic motors and pumps in response to a reduction in engine speed, adjustment of the hydraulic pump and motor displacement will continue until lower set point C is reached or until the motor speed stabilizes or increases.

Once the engine speed returns to a point above the overload set point shown in the example of FIG. 14 to be 2,800 r.p.m., the pump and motor control means will gradually readjust the displacements of the hydraulic pumps and motors in accordance with the displacement of the accelerator pedal by the vehicle operator. In so doing, the pump and motor control means will first increase the displacement of the hydraulic pumps and thereafter decrease the displacement of the hydraulic motors, if necessary, until normal operating control is restored. This feature prevents cycling of the pump and motor control means caused by engine speed moving above and below the overload set point.

A toggle switch, or other suitable device, is located on the instrument panel of the vehicle 10 to allow disablement of the overload prevention feature provided by the pump and motor control means. The pump and motor control means operates in combination with the steering control means to vary the displacement of the hydraulic pumps of the hydrostatic drive system to skid-steer the vehicle 10 whether the overload prevention feature is operational or disabled.

FIGS. 15 through 20b illustrate the wheel member positioning means, the braking means, the steering control means, the hydrostatic drive system and the pump and motor control means of the vehicle 10. Referring specifically to FIG. 15, there is shown a control assembly 100 includes an enclosure 102 that houses one or more circuit boards 104 for controlling operation of the vehicle 10. Also housed within the enclosure 102 are a steering module 106 and a drive selector module 108. The modules 106 and 108 are connected to a steering wheel 110 and a drive selector arm 112 positioned on the exterior of the enclosure 102, respectively. The control assembly 100 is mounted within the cab of the vehicle 10 for operation by the vehicle operator.

FIG. 16 illustrates the internal construction of the steering module 106 in cross section. The module 106 includes a steering shaft 114 to which the steering wheel 110 is mounted by means of fastener 116 extending through the shaft 114 and the steering wheel 110 to engage an endplate 118. The steering shaft 114 is rotatably mounted within the housing 120 of the module 106 by ball bearing assemblies 122 and 124. Ball bearing assembly 122 is secured within the housing 120 adjacent the steering wheel 110 by means of a snap ring 126 and a collar 128. A seal is maintained between the abutting surfaces of the ball bearing assembly 122 and the housing 120 by an O-ring 130 embedded in the surface of the housing 120. Similarly, a seal is maintained between the abutting surfaces of the ball bearing assembly 122 and the steering shaft 114 by an O-ring 132 embedded in the shaft 114.

The steering shaft 114 is urged towards a central rotational position by means of a spring 134. The spring 134 includes integral positioning arms 136 and 138 extending from opposite ends thereof. When the steering shaft 114 is centrally positioned, the positioning arms 136 and 138 are urged against the surfaces of fasteners 140 and 142 and the surfaces of pins 144 and 146. The fasteners 140 and 142 serve as stops limiting travel of the positioning arms 136 and 138 of the spring 134 and also cooperate with the fasteners 148 and 150 to secure the collar 128 within the housing 120.

The fasteners 140 and 142 are positioned in substantial alignment with the pins 144 and 146 when the steering shaft 114 is centrally positioned. As the steering wheel 110 is rotated clockwise, the pin 146 displaces the positioning arm 138 from the positioning arm 136, which is held against the fastener 140 by the force of the spring 134. Conversely, counterclockwise rotation of the steering wheel 110 displaces the positioning arm 136 from the positioning arm 138, which is held by the fastener 142 against the force of the spring 134. Rotation of the steering wheel 110 is limited by the fasteners 148 and 150 which are positioned in the path of travel of the pins 144 and 146. Such limitation of the rotation of the steering wheel 110 prevents damage to the spring 134 by overdeflection. If desired, the steering wheel 110 can be locked against rotation by advancing the fasteners 148 and 150 into apertures 152 and 153 in the steering shaft 114.

The steering shaft 114 is held within the housing 120 by means of a snap ring 155 which abuts the ball bearing assembly 124. Extending from the inserted end of the steering shaft 114 is a pinion 154 having an aperture therethrough. The pinion 154 engages a rotary gear 156 of a potentiometer 158 or other suitable transducer. As the steering wheel 110 is turned by the vehicle operator, the pinion 154 rotates the rotary gear 156, thereby allowing the potentiometer 158 to sense the rotational position of the steering wheel 110.

The steering module 106 also includes a horn button 162 which is slidably mounted in an aperture 164 in the endplate 118. A stem 166 extends from the horn button 162 through a passageway 168 in the steering shaft 114, through the center of the pinion 154 and into contact with a horn switch 170 mounted on a support plate 160. The horn button 162 and the stem 166 are urged outwardly from the steering module 106 by a spring 172 interposed between the horn button 162 and the steering shaft 114. Movement of the horn button 162 and the stem 166 outwardly from the steering module 106 is limited by a snap ring 174 which abuts the pinion gear 154 to limit travel of the stem 166 outwardly of the steering module 106. A lip seal 176 surrounds the stem 166 at the entrance of the passageway 168 of the steering shaft 114 to prevent passage of unwanted liquids, dust and dirt into the steering module 106.

The horn (not shown) of the vehicle 10 is actuated by depression of the horn button 162, which displaces the stem 166 inwardly against the switch 170 and closes an electrical circuit controlling operation of the vehicle horn. The switch 170 and the potentiometer 158 are electrically connected to a connector box 178 mounted on the endwall 160. Contacts 180 of the connector box 178 are, in turn, electrically connected to the contacts 182 of a connector plug 184 mounted on and endwall 186 closing one end of the steering module 106. In this manner, the horn switch 170 and the potentiometer 158 are electrically connected to the vehicle horn and the steering control means of the vehicle 10, respectively. The endwall 186 is secured to the steering module 106 by means of fasteners 188 against an O-ring 190 embedded in the housing, thereby sealing the steering module 106 against unwanted fluids, dirt, dust and other contaminants.

Referring now to FIG. 17, there is shown a selector module 200 for use in the operation of the vehicle 10. The selector module 200 incorporates numerous component parts which are substantially identical in construction and operation to the component parts of the steering module 106 illustrated in FIG. 16. Such identical component parts are designated in FIG. 17 with the same reference numerals utilized in the description of the steering module 106 (of FIG. 16), but are differentiated therefrom by means of a prime (') designation.

The primary differentiation between the steering module 106 and the selector module 200 relates to the mechanism for changing the rotational position of a potentiometer 202 within the housing 120'. The drive selector arm 112 is rotatably mounted on the selector module 200 by means of a selector shaft 204. The selector shaft 204 extends within a spacer collar 206 which is secured within the housing 120' by means of fasteners 208 and 210 extending through aligned apertures in the spacer collar 206 in the housing 120'.

The drive selector arm 112 is fastened to the endplate 118' by means of a fastener 205 for pivotal movement. The shank of the drive selector arm 112 tapers along one side thereof within the selector shaft 204 to rest flush against the inner surface of the end plate 118'. A compression spring 212 is disposed within an aperture 214 in the endplate 118' to pivotally urge the drive selector arm 112 against a slide bar 216. The slide bar 216 is slidably mounted for longitudinal movement through the lip seals 176' and a passageway 218 through the center of the selector shaft 204.

The selector shaft 204 includes a detent chamber 220 which houses a detent pin 222 and a compression spring 224. The chamber 220 affords room for movement of the detent pin 222. The spring 224 urges the detent pin 222 against the slide bar 216 and against detent spaces (not shown) located in diametrically opposed locations about the surface 226 of the spacer collar 206.

The selector shaft 204 is secured within the housin 120' by means of a snap ring 227 which abuts the ball bearing assembly 124'. The end of the selector shaft 204 surrounds a shaft 228 extending from the potentiometer 202 and a spacing collar 230 interposed therebetween. The potentiometer is mounted on a support wall 231 within the housing 120'. The selector shaft 204 is connected to the shaft 228 and the collar 230 for concurrent rotation therewith by means of a fastening pin 232 extending through aligned apertures of the shaft 228, collar 230, and selector shaft 204. Rotation of the selector shaft 204 thus rotates the shaft 228 of the potentiometer 202, allowing the potentiometer 202 to sense the rotational position of the drive selector arm 112.

In the operation of the selector module 200, the drive selector arm 112 is pivotted towards the operator, thereby displacing the slide bar 216 and the detent pin 222 inwardly against the action of the spring 224. This moves the detent pin 222 out of contact with the detent spaces in the surfaces 226 of the spacer collar 206, thereby freeing the detent pin 222 and the selector shaft 204 for rotation within the housing 120'. The drive selector arm 112 may then be positioned to select one of the desired drive modes of Neutral, Forward, Reverse, Counter Rotate Left and Counter Rotate Right. Upon release of the drive selector arm 112, the detent pin 222 is displaced by the spring 224 in engagement with the detent spaces on the surfaces 226 of the spacer collar 206, thereby holding the selector shaft 204 against rotation. Preferably, the detent spaces are positioned to correspond with each of the aforementioned drive modes. The rotational position of the drive selector arm 112 and the selector shaft 204 is sensed by the potentiometer 202 thrugh the shaft 228 and is electrically communicated to the pump and motor control means via the plug 184'.

Figure 18:
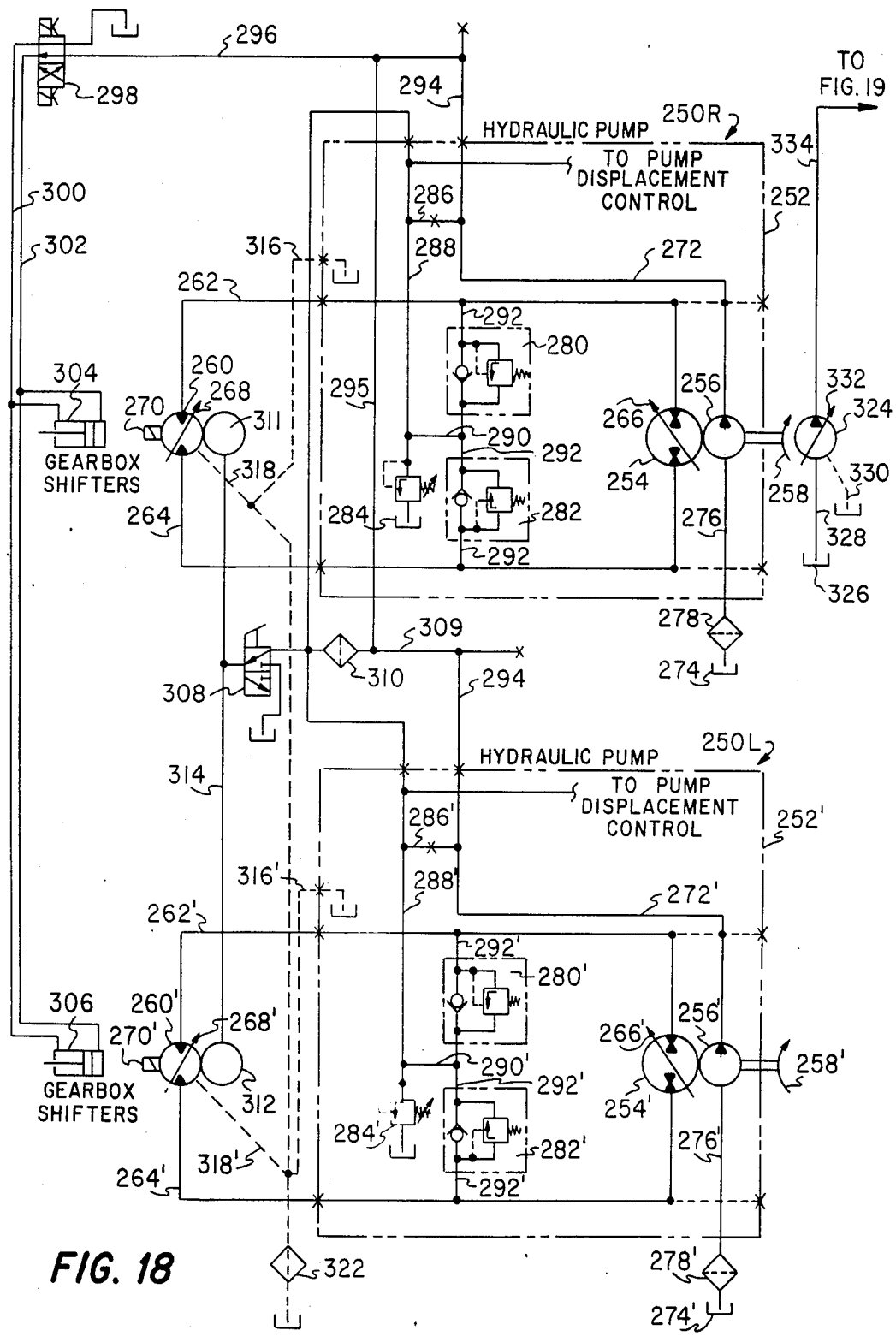
FIG. 18 is a schematic illustration of the hydrostatic drive system of the vehicle.
Figure 19:
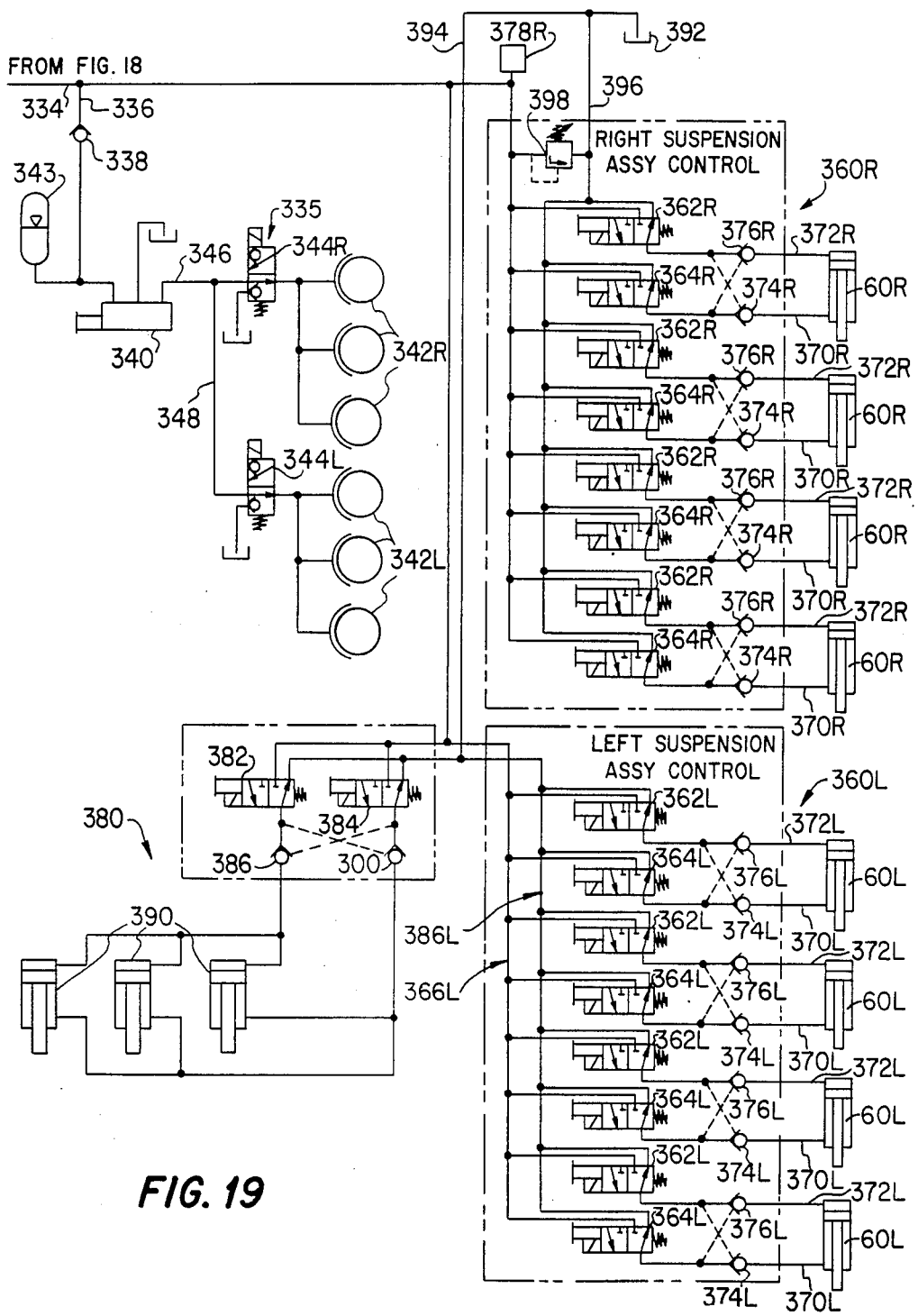
FIG. 19 is a continuation of the hydraulic schematic diagram of FIG. 18.
Figure 20:
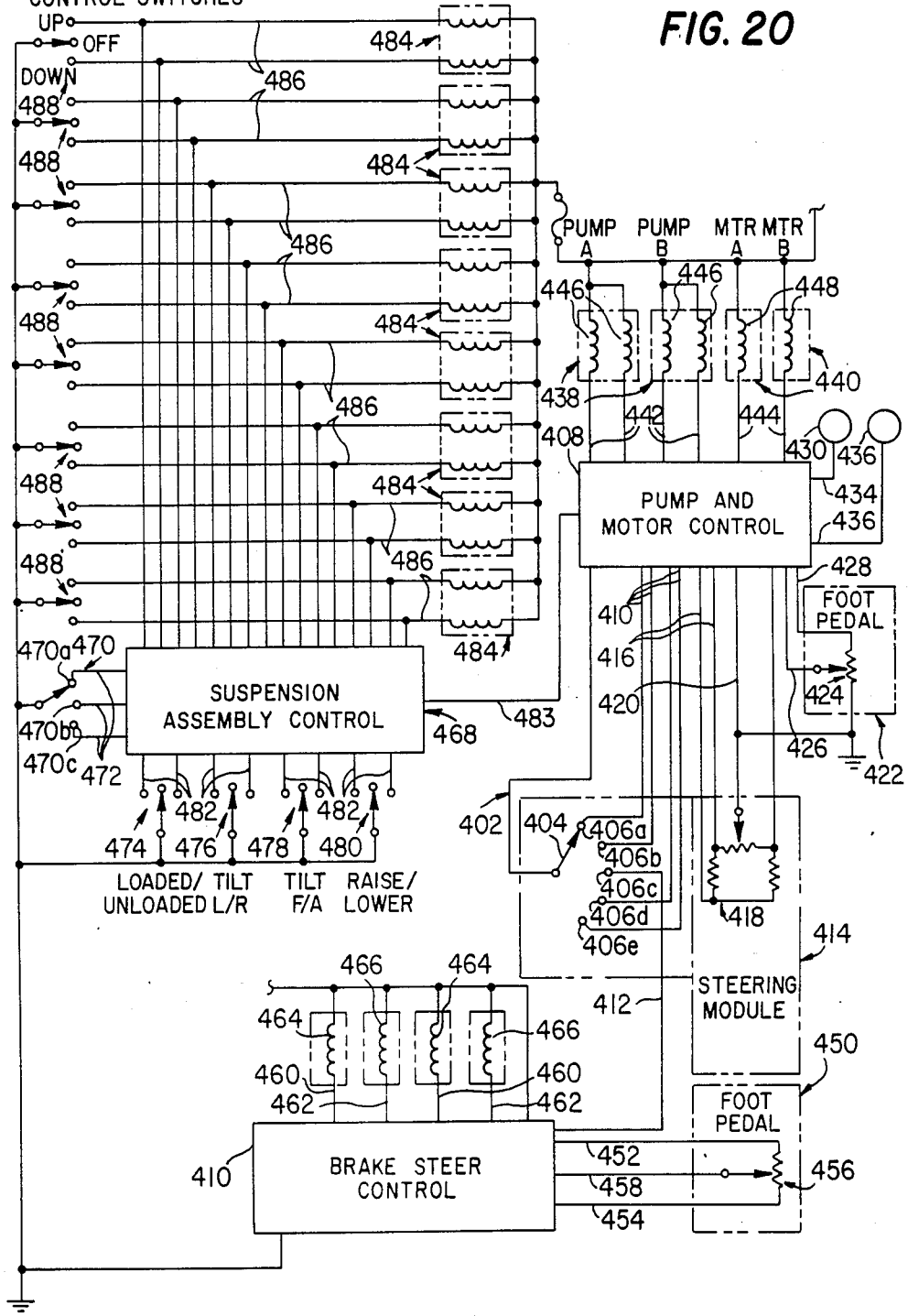
FIG. 20 is an schematic illustration of the electrical control system of the vehicle.

Referring now to FIGS. 18 and 19, there is shown a schematic diagram of the hydraulic system of the vehicle 10, including components of the hydrostatic drive system, the braking system and the suspension assemblies 20. In particular, FIG. 17 illustrates the hydraulic pump and motor systems 250L and 250R for the left and right wheel members 14, respectively, of the vehicle 10. The systems 250L and 250R incorporate numerous corresponding component parts which are substantially identical in construction and operation. Such identical component parts are designated with the same reference numeral in both of the systems 250L and 250R; however, the components of system 250L differentiated from the components of system 250R by means of a prime (') designation.

Components of the hydraulic pump of system 250R are enclosed within a broken line 252. The primary component of the hydraulic pump of system 250R is a primary pump 254. Also included in the hydraulic pump of system 250R is a smaller charge pump 256. Both the primary pump 254 and the charge pump 256 are driven by an engine, or other suitable prime mover, represented by an arrow 258.

Power supplied by the engine 258 drives the primary pump 254 to supply highly pressurized hydraulic fluid to a hydraulic motor 260 via a high pressure hydraulic line 262. Hydraulic fluid exits from the motor 260 and is returned to the inlet side of the primary pump 254 via a low pressure hydraulic line 264. The primary motor 254, the high pressure hydraulic line 262, the hydraulic motor 260, and the low pressure hydraulic line 264 form a closed-loop hydraulic drive system for the wheel members 14 on the right side of the vehicle 10.

The primary pump 254 and the motor 260 have variable displacements, as is indicated by arrows 266 and 268, respectively. The displacements of the primary pump 254 and the hydraulic motor 260 are varied in accordance with electrical signals received from the pump and the motor control means of the vehicle 10 to vary power output, velocity and direction of the vehicle 10. Actual adjustment of the displacement of the primary pump 254 is accomplished by a conventional electro-hydraulic proportional control (not shown) which responds to electrical signals received from the pump and motor control means. Displacement of the hydraulic motor 260 is actually adjusted by a control solenoid 270 which responds to electrical signals received from the pump and motor control means.

The charge pump 256 is used primarily for replenishing the supply of hydraulic fluid within the closed loop hydraulic circuit of the primary pump 254 and the motor 260. The charge pump 256 receives hydraulic fluid from a source via a hydraulic line 276, including a filter 278. The charge pump 256 communicates with relief valves 280, 282 and 284 via lines 272, 286, 288, 290 and 292. The relief valve 280 is set at a pressure above the normal operating pressure of the high pressure hydraulic line 262 to prevent pressure within line 62 from exceeding a safe limit. Similarly, relief valve 282 is set at a pressure above the normal operating pressure of the low pressure hydraulic line 264 to prevent pressure within a line 264 from exceeding a safe limit. In the event that either relief valve 280 or 282 discharges, the resulting increased pressure within the lines 292, 290 and 288 will be relieved by the relief valve 284, which is set at a pressure above the normal operating pressure of the charge pump 256. Hydraulic fluid in line 292 will pass through valve 282 into the low pressure hydraulic line 264 of the closed-loop system to replace hydraulic fluid spent through leakage, for example, during operation of the system 250R.

Pressurized hydraulic fluid from the charge pump 256 is also utilized to operate secondary functions of the hydrostatic drive system shown in FIG. 17. Specifically, hydraulic fluid from line 288 is directed to the electro-hydraulic proportional control the system 250R to serve as the operating fluid powering variation of the displacement of the primary pump 254. Hydraulic fluid from the charge pumps 256 and 256' is also directed to a solenoid operated two-way valve 298 via lines 294, 295 and 296. The two-way valve 298 is actuated in response to signals received from the pump and motor control means to direct pressurized fluid to either of lines 300 or 302 servicing hydraulic gear box shifters 304 and 306. The shifters 304 and 306 can be actuated in this manner to change the gear boxes associated with the hydraulic motors 260 and 260', respectively, between low and high gear settings, as desired.

Pressurized hydraulic fluid from charge pumps 256 and 256' is directed from lines 294' and 295 to a solenoid actuated two-position valve 308 via line 309 and filter 310. The valve 308 can be actuated either automatically or selectively by the operators as a safety and/or parking brake to apply hydraulic pressure to the brake cylinders 311 and 312 on opposing sides of the vehicle 10 via line 314.

The broken lines shown in FIG. 18 illustrate the case return lines for hydraulic fluid spent in the operation of the vehicle 10. Specifically, hydraulic fluid discharged from relief valves 284 and 284' exits the hydraulic pumps via return lines 316 and 316' respectively. Hydraulic fluid spent during operation of the hydraulic motors 260 and 260' is discharged through return lines 318 and 318'. All such spent hydraulic fluid is ultimately expelled from the systems 250R and 250L via return line 320. The return line 320 includes a heat exchanger 322 which extracts excess heat from the spent hydraulic fluid.

The hydraulic motor system 250R includes an auxiliary pump 324 which provides hydraulic pressure to the braking, wheel positioning and stabilizing components of the vehicle 10. Hydraulic fluid is supplied to the auxiliary pump 324 from a source 326 via a line 328. Spent hydraulic fluid is discharged from the auxiliary pump 324 via a return line 330. The auxiliary pump 324 has a variable displacement, as is indicated by an arrow 332, thereby allowing variation of the hydraulic fluid supply pressure provided to the systems service by the auxiliary pump 324. Such systems are supplied with pressurized hydraulic fluid from pump 324 via a line 334.

Referring now to FIG. 19, pressurized hydraulic fluid from the auxiliary pump 324 is supplied to the hydraulic system shown via a line 334. Fluid from the line 334 is supplied to the braking system of the vehicle 10 via a line 336, which includes a check valve 338. The check valve 338 reduces the effect of pressure variations within the braking system 335 on the remaining systems serviced by the auxiliary pump 324.

Hydraulic fluid from line 336 passes through a pressure modulator 340, which varies the pressure of hydraulic fluid supplied to the brakes 342L and 342R of the vehicle 10. Hydraulic fluid spent during operation of the pressure modulator 340 is discharged therefrom via a line 342. An accumulator 343 is provided to replenish hydraulic fluid lost in the operation of the pressure modulator 340. Pressurized hydraulic fluid from the pressure modulator 340 is applied to solenoid actuated two-position valves 344L and 344R via lines 346 and 348. The valves 344L and 344R, respectively, service the brakes 342L on the left side of the vehicle 10 and brakes 342R on the right side of the vehicle 10. Hydraulic pressure corresponding to that selected by the pressure modulator 340 is applied to the brakes 342L and 342R when the valves 344L and 344R are in the position shown in FIG. 18. It will be understood that the braking force applied by the brakes 342L and 342R corresponds directly with the pressure selected by the pressure modulator 340 when the valves 344L and 344R are open.

In the operation of the vehicle 10, the pressure modulator 340 responds to electrical signals received from the braking control means to vary the hydraulic pressure supplied to the valves 344L and 344R in accordance with the braking force desired by the vehicle operator. When the vehicle 10 is directed along a straight forward path during braking, both of the valves 344L and 344R are open and apply continuous hydraulic pressure to the brakes 342L and 342R. However, when the operator directs the vehicle 10 into a turn, the braking control means responds to the steering control means of the vehicle 10 by pulsating the braking force applied by whichever of the brakes 342L or 342R are positioned on the inboard side of the turn, as illustrated in FIG. 11 and previously discussed with reference thereto. This is accomplished by intermittently actuating whichever of the valves 344L or 344R is associated with the brakes on the inside of the turn. Such actuation reduces the effective braking force applied to the inboard side of the vehicle to facilitate the turning of the vehicle. As the vehicle 10 is directed into a turn of smaller radius, the interval between successive actuations of the valves 344L or 344R will be increased, thereby reducing the effective braking force applied by the associated brakes. Additionally, when the operator directs a turn of minimum radius, for example to the left, the pressure modulator 340 and the valve 344L are adjusted by the braking control means to lock the brakes 342L of the vehicle 10. The valve 344R is actuated similarly by the braking control means when the vehicle operator directs vehicle turn of minimum radius to the right.

The auxiliary pump 324 also supplies pressurized hydraulic fluid for the operation of the hydraulic cylinders 60 of the suspension assemblies 20 of the vehicle 10 via lines 334 and 350. Numerous components controlling actuation of the hydraulic cylinders 60 on the right side of the vehicle 10 are substantially identical in construction and operation to the components controlling actuation of the hydraulic cylinders 60 on the left side of the vehicle. Accordingly, such identical components are identified in FIG. 19 with the same reference numeral; however, components associated with the right side of the vehicle 10 include a designation "R" while components associated with the left side of the vehicle 10 include a designation "L". Therefore, discussions pertaining to any single component will apply equally to other components identified with the same reference numeral.

Pressurized hydraulic fluid received from the auxiliary pump 324 is distributed to the solenoid actuated two-position valves 362R and 364R associated with each hydraulic cylinder 60R by means of a distribution manifold 366R. Similarly, return of hydraulic fluid from the valve 362R and 364R associated with each hydraulic cylinder 60R is accomplished by means of a return manifold 368R.

The valves 362R and 364R are actuated in response to electrical signals received from the wheel member positioning means of the vehicle 10. The valves 362R and 364R are shown unactuated in FIG. 19. In this position, both sides of the hydraulic cylinders 60R are connected to the return manifold 368R. When the valves 362R are actuated, hydraulic fluid is directed to their associated hydraulic cylinders 60R via hydraulic lines 372R to extend the piston rods thereof. Simultaneously, hydraulic fluid exits the hydraulic cylinders 60R via hydraulic lines 370R through the valves 364R. Conversely, actuation of the valves 364R directs hydraulic fluid to their associated hydraulic cylinders 60R via hydraulic lines 370R to retract the piston rods thereof. The hydraulic lines 370R and 372R include respective pilot operated check valves 374R and 376R. The check valve 374R is opened in response to an increase in hydraulic pressure within the hydraulic line 372R between the valves 362R and 376R. Likewise, the check valve 376R opens in response to an increase in hydraulic pressure within hydraulic line 370R between the valve 364R and the valve 374R. Thus, the check valves 374R and 376R remain closed when their respective valves 364R and 362 are unactuated, locking the hydraulic cylinders 60R associated therewith against movement.

Such actuation of the valves 362R and 364R is accomplished in response to electrical signals received from the wheel member positioning means, or the individual controls located on the control panel of the vehicle 10, to adjust the suspension assemblies 20 of the vehicle 10 as previously discussed with reference to FIGS. 3, 4, 5, 6, 7, 8 and 9. In operation, the wheel member positioning means adjusts the position of the piston rods of the hydraulic cylinders 60 in approximately equivalent incremental lengths in sequence about the vehicle until their desired positions are reached. The sequence is initiated with the forwardmost of the wheel members 14 to be actuated, first actuating the piston rod of the cylinder 60 on one side of the vehicle 10 and then actuating the piston rod of the cylinder 60 on the opposing side of the vehicle 10. This process is repeated for the hydraulic cylinders 60 of the next rearward pair of wheel members 14, and so on, until the piston rods of all of the hydraulic cylinders 60 to be adjusted have been moved an incremental distance. This cycle is repeated until the piston rods of all of the wheel members to be adjusted have been properly positioned.

Thus, for example, in tilting of the vehicle 10 as shown in FIG. 7, the front left hydraulic cylinder 60 would first be actuated to retract its piston rod an incremental length, followed by actuation of the hydraulic cylinder 60 on the front right of the vehicle 10 to extend its piston rod an incremental length, and so on for corresponding pairs of wheel members 14 progressing toward the rear of the vehicle. This cycle is repeated until the operator discontinues titling of the vehicle or until the piston rods of the hydraulic cylinders 60 are fully extended or retracted.

It will be understood that a similar cycling sequence will take place when the hydraulic cylinders 60 are actuated by the wheel member positioning means in response to the steering control means. When the hydraulic cylinders 60 are actuated in response to the steering control means as a vehicle turn is directed, the wheel member positioning control means will begin the retraction cycle adjusting the appropriate hydraulic cylinders 60 sequentially for as long as a turn is directed, but not exceeding five cycles. Upon completion of the turn, the wheel member positioning control means returns the hydraulic cylinders 60 to their normal position through similar sequential cycling.

The piston rods of the hydraulic cylinders 60 are each displaced a substantially equivalent distance during each positioning cycle. Referring again to FIG. 19, the valves 362R and 364R of each hydraulic cylinder 60R and the valves 362L and 364L of each hydraulic cylinder 60L are actuated by the wheel member positioning control means for a substantially equivalent time interval during each positioning cycle. Since the hydraulic pressure within the distribution manifolds 366R and 366L are substantially equivalent, substantially the same quantity of hydraulic fluid is introduced and removed from the hydraulic cylinders 60R and 60L with each cycle, resulting in equal displacement of the piston rods of such cylinders.

A pressure switch 378R is provided in line 334 for sensing the hydraulic pressure within the manifolds distribution manifolds 366L and 366R. The pressure switch 378R is electrically connected to the wheel member positioning control means. The set point of the pressure switch 378R is just below the normal operating pressure of the auxiliary pump 324. The pressure switch 378R is tripped during actuation of any of the hydraulic cylinders 60R and 60L due to a resulting drop in the pressure of the distribution manifolds 366R and 366L. If the pressure switch does not sense a pressure drop within the distribution manifolds 366R and 366L as the wheel member positioning means attempts actuation of one the hydraulic cylinders 60R or 60L associated therewith, that particular hydraulic cylinder will be assumed to have been either fully extended or retracted and will, therefore, be eliminated by the wheel member positioning means from the following positioning cycle. In this way, unnecessary attempts at actuating the hydraulic cylinders 60R and 60L are eliminated, thereby increasing the efficiency of the wheel member positioning control means.

Hydraulic pressure supplied by a line 350 is also utilized to operate a stabilizing system 380 of the vehicle 10. The stabilizing system 380 includes a pair of solenoid actuated two-position valves 382 and 384 and a pair of pilot actuated check valves 386 and 388, which are actuated in a manner substantially identical to that described with reference to valves 362R and 364R of the suspension assembly control 360R. The valves 382 and 384 are actuated to simultaneously extend or retract three stabilizer jacks 390. One of the stabilizer jacks 390 is positioned at the front of the vehicle 10, while the remaining two stabilizer jacks 390 are placed adjacent the rear of the vehicle 10. The stabilizer jacks 390 can be extended when the wheel members 14 of the vehicle 10 have been fully retracted to offer support to the vehicle 10 or to raise the vehicle 10 off the underlying surface. The valves 382 and 384 are actuated in response to electrical signals received from a switch mounted on the control panel of the vehicle 10.

Hydraulic fluid discharged from the suspension assembly control 360L and the stabilizing system 380 is returned to a reservoir 392 via a line 394. Similarly, hydraulic fluid discharged from the suspension assembly control 360R is returned to the reservoir 392 via a line 396 which connects to the line 394. The suspension assembly control 360R includes a pressure relief valve 398, which interconnects the hydraulic fluid supply line 334 with the line 396, thereby providing protection against excessive hydraulic fluid pressure for all of the systems shown in FIG. 18.

FIG. 19 is an electrical schematic diagram showing the transmission of various input, output and control signals between components of the control systems of the vehicle 10. A shifter module 400, such as that shown in FIG. 16, is supplied with an electrical signal via a line 402. The electrical signal from line 402 can be selectively applied by the shifter 404 to any one of the selector positions 406a-e. Positions 406a-e correspond to the Neutral, Reverse, Forward, Counter Rotate Left and Counter Rotate Right drive modes, respectively. When the Neutral, Reverse, Counter Rotate Left or Counter Rotate Right drive modes are selected, the electrical signal received from the line 402 is directed to a pump and motor control circuit 408 via lines 410. When the selector 404 is placed in the Forward drive mode at selector position 406c, an electrical signal from line 402 is applied to the brake steer control circuitry 410 via a line 412.

A steering module 414, such as that illustrated in FIG. 15, is electrically connected to the pump and motor control circuitry 408 via lines 416. The steering module 414 includes a potentiometer 418 which is supplied with an electrical signal via a line 418. The signal received from the line 420 is varied by the potentiometer 418 in response to steering commands from the vehicle operator and are returned to the pump and motor control circuitry 408 via the lines 416.

An accelerator pedal 422 is provided to receive power output commands from the vehicle operator. The accelerator pedal 422 includes a potentiometer 424 which receives an electrical signal from the pump and motor control circuitry 408 via a line 426. The accelerator pedal 422 is manufactured by PQ Controls, Incorporated of Briston, Conn. and is identified by Model No. 110-476. The signal received from line 426 is varied by the potentiometer 424 in response to commands from the vehicle operator and is then returned to the pump and motor control circuitry 408 via a line 428. The pump and motor control circuitry 408 also receives input from motor speed sensors 430 (only one shown) and an engine speed sensor 432 via lines 434 and 436, respectively. The motor speed sensors 430 and the engine speed sensor 432 comprise tachometers or other suitable speed sensing devices.

The electrical signals received by the pump and motor control circuitry 408 are processed and applied to the hydraulic pumps 438 and the hydraulic motors 440 via lines 442 and 444, respectively. Specifically, the lines 442 apply electrical signals to the control solenoids 446 of the electro-hydraulic proportional control of each of the pumps 438 to control the displacements thereof. The line 444 apply electrical signals from the pump and motor control circuitry 408 to the control solenoids 448 of each of the hydraulic motors 440 to control the displacements thereof. It will be understood that the pump and motor control circuitry 408 varies the displacement of the hydraulic pumps 438 and the hydraulic motors 440 in response to the various input signals received to produce the performance features of the vehicle 10 previously discussed herein.

Braking of the vehicle 10 is controlled by the brake steer control circuitry 410. As previously noted, the brake steer control circuitry 410 receives an electrical signal from the shifter module via the line 412 when the Forward drive mode is selected. The signal received from the line 412 originates with the pump and motor control circuitry 408 and is applied to the shifter module 400 via the line 402. This signal, in turn, is varied by the pump and motor control circuitry 408 in response to vehicle operator steering commands received from the steering module 414. Thus, the brake steer control circuitry 410 is responsive to the steering control of the vehicle 10 when the vehicle 10 is in the Forward drive mode.

The brake steer control circuitry 410 also receives input from a brake pedal 450 via lines 452 and 454. The brake pedal 450 includes a potentiometer 456 which receives an electrical signal from the brake steer control circuitry 410 via a line 458. Braking commands from the vehicle operator cause a variation in the signals received by the brake steer control circuitry 410 as the position of the potentiometer 456 is varied. The electrical signals received from lines 412, 452 and 454 are processed by the brake steer control circuitry 410 and are thereafter applied to the braking system of the vehicle 10 via lines 460 and 462. Lines 460 are connected to the control solenoids 464 of the pressure modulators associated with the braking systems on opposing sides of the vehicle 10. Lines 462 are connected to the control solenoids 466 of the valves which pulse the braking systems of the vehicle 10 to brake-steer the vehicle in the manner illustrated in FIG. 11.

Control of the hydraulic cylinders 60 of the suspension assemblies 20 of the vehicle 10 is accomplished by the suspension assembly control circuitry 468. A primary operating mode selector 470 is variable between selector positions 472a-c. The selector positions 470a-c correspond with the Normal, City and Select primary control modes of the wheel member positioning means of the vehicle 10. The selector 470 applies an electrical signal to the suspension assembly control circuitry 468 designating the desired primary control mode via lines 472. The secondary control modes of Load/Unloaded, Tilt Left/Right, Tilt Forward/Aft and Raise/Lower are selected by selectors 474-480, respectively. The selectors 474-480 may each be displaced from a neutral selector position to apply an electrical signal to the suspension assembly control circuitry 468 via one of the adjacent lines 482.

Electrical signals are also received by the suspension assembly control circuitry 486 from the pump and motor control circuitry 408 via a line 483. The electrical signal carried by line 483 reflects input to the pump and motor control circuitry 408 from the steering module 414. Thus, the suspension assembly control circuitry 486 is responsive to directions from the steering module 414. The electrical signals received by the suspension assembly control circuitry 486 are processed and are thereafter applied to the control solenoids 484 of the hydraulic cylinders 460 via lines 486. Such output signals from the suspension assembly control circuitry 486 control positioning of the piston rods of the hydraulic cylinders 60 as previously discussed herein.

Individual operation of the hydraulic cylinders 60 is accomplished by means of suspension assembly control switches 488. Each switch 488 may be actuated to one of two alternate positions to extend or retract the piston rod of the hydraulic cylinder 60 associated therewith. In this manner, the load and vertical position of each of the wheel members 14 of the vehicle 10 is individually adjustable.

Figure 21A:
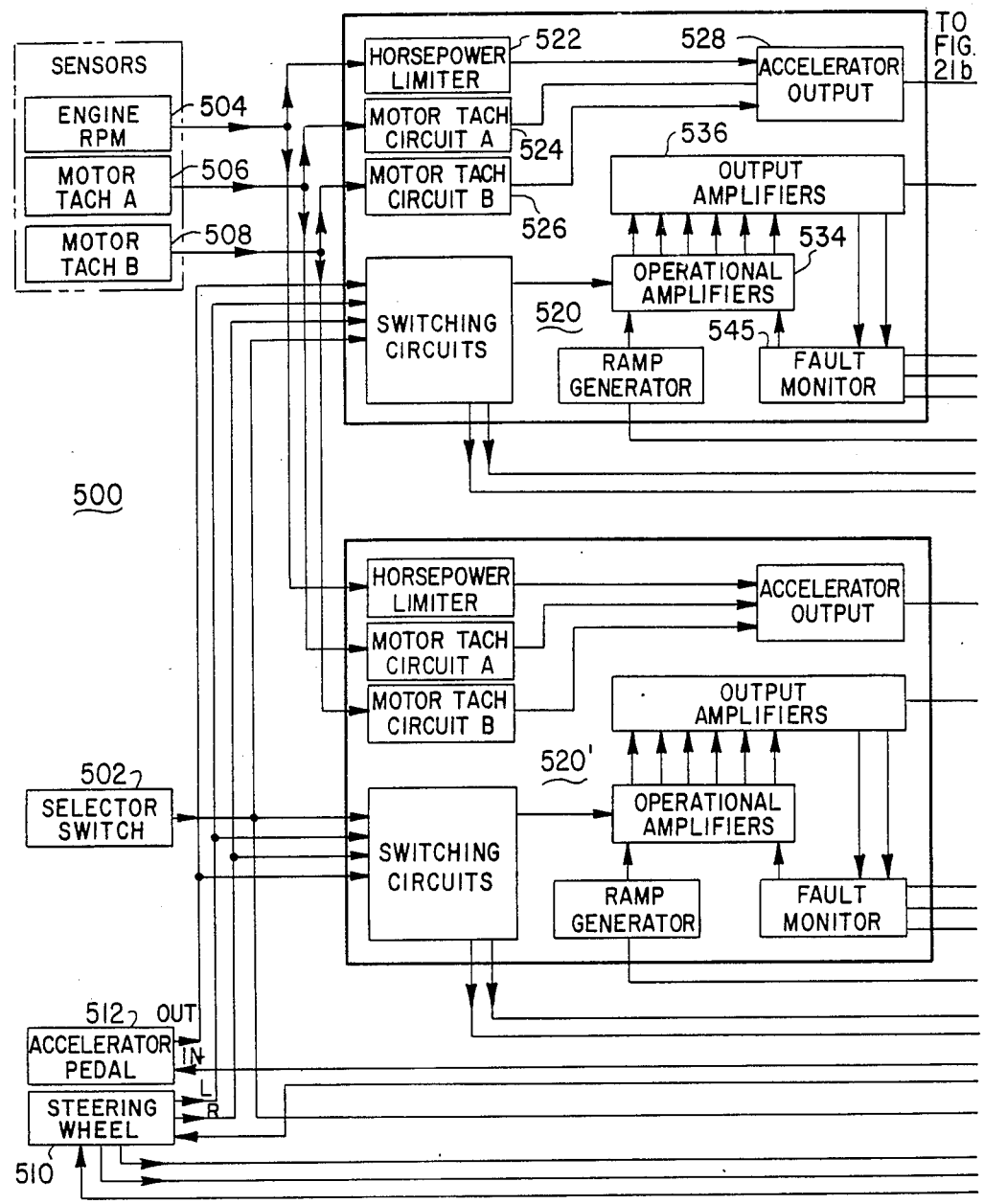
FIG. 21a is an upper level schematic diagram of the control system of the vehicle.
Figure 21B:
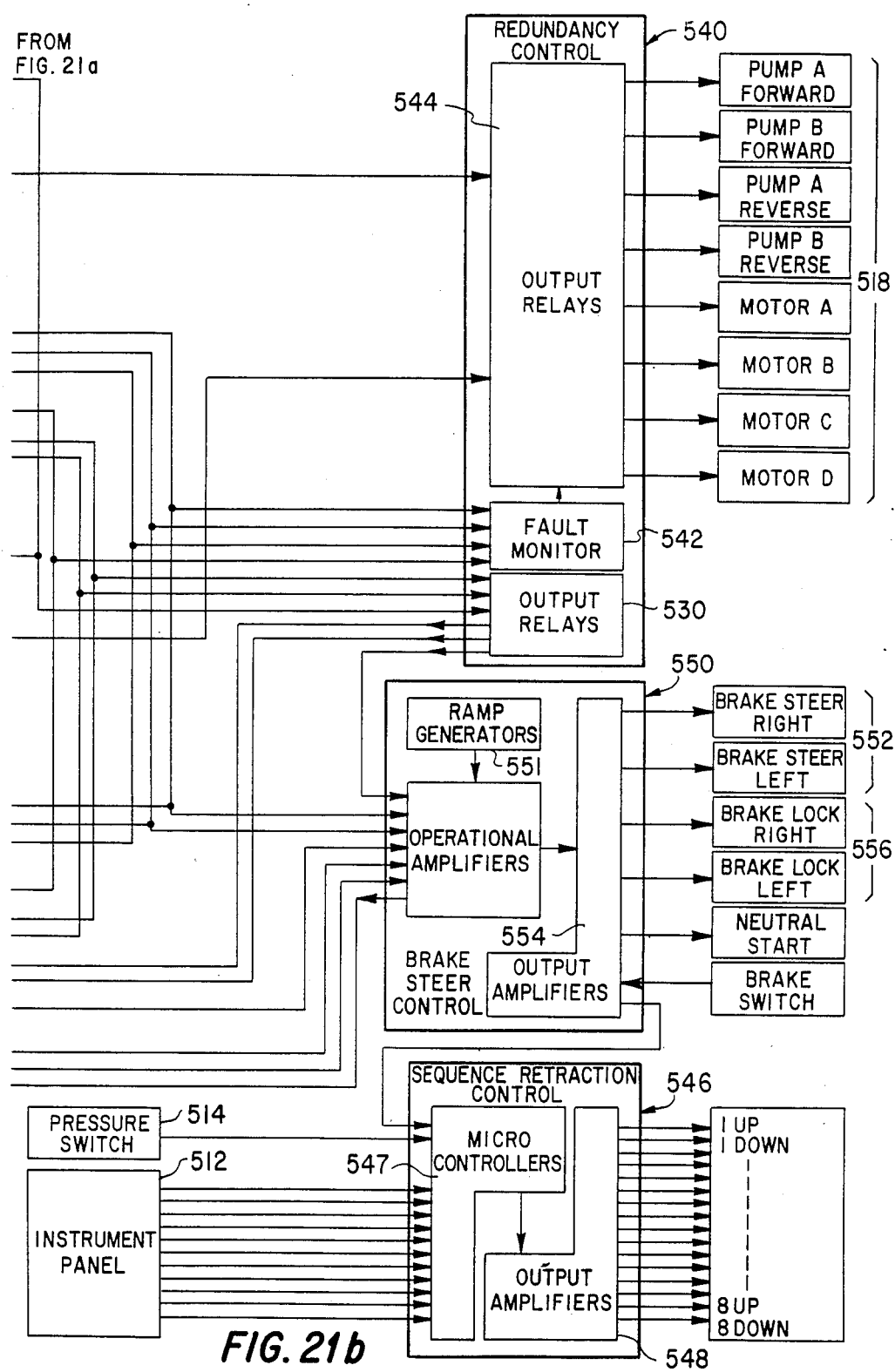

Referring now to FIGS. 21a and 21b, a schematic diagram is shown of a hydrostatic pump drive controller 500 for use in controlling the vehicle 10 according to the present invention. Generally, the controller 500 functions as a switching device for making hydraulic pump assignments, and operates as a proportional power controller to control the hydraulic pumps and motors previously described.

Functionally, the controller 500 receives an assignment command by the operator through a selector switch 502 which is used to select the direction of vehicle operation, either Forward, Reverse, Neutral, Counterrotate Left or Counterrotate Right. The controller 500 also receives speed commands from a plurality of sensors: an engine tachomoeter 504, a first motor tachometer 506 connected to the motor on the left side of the vehicle (Motor "A"), and a second motor tachometer 508 connected to the motor on the right side of the vehicle (Motor "B"). The controller 500 also receives "left" and "right" steering commands from a steering wheel circuit 510, and receives a control signal from a accelerator pedal circuit 512. The steering wheel circuit 510 and accelerator circuit 512 are in turn controlled by the various functional circuits in the controller as will be described. Controller 500 also receives inputs from a plurality of switch control devices on a vehicle instrument panel 514 and a pressure switch 516.

As also seen in FIGS. 21a and 21b, the controller 500 serves to control a plurality of solenoids designated generally by the reference numeral 518. These solenoids control forward and reverse actuation and the displacements of pumps "A" and "B" i.e., the pumps on the left and right side, respectively, of the vehicle, and control the displacement of the corresponding motors "A" and "B", respectively. It should be appreciated that the controller 500 also includes additional solenoids for controlling additional motors, such as motors "C" and "D", if desired. The motors "C" and "D", however, are not used in the preferred embodiment as described above.

The various signals provided from the input devices 502-512 of the controller 500 are applied to redundant pump and motor control circuits, designated generally by the reference numerals 520 and 520'. Because the operation of these control circuits are identical, a functional description will only be provided for pump and motor control circuit 520, with the understanding that the operation of the pump and motor control circuit 520' is identical. This built-in redundancy increases the overall reliability of the terrain vehicle 10.

With reference now to the pump and motor control circuit 520, this circuit includes a horsepower limiter circuit 522 connected to receive the output of the engine tachometer 504, and a pair of motor tachometer circuits 524 and 526, for receiving the respective outputs of the first and second motor tachometers 506 and 508. The outputs of the horsepower limiter circuit 522 and the motor tachometer circuits 524 and 526 are connected to control an accelerator output circuit 528, the output of which is fed back to control the accelerator pedal circuit 512 through an output relay circuit 530. The pump and motor control circuit 520 also includes a switching circuit 532 for receiving the outputs from the selector switch 502, the steering wheel circuit 510 and the accelerator pedal circuit 512. Specifically, the switching circuit 532 receives an instruction command from the selector switch 502, and in response thereto assigns the inputs provided from the steering wheel circuit 510 and accelerator pedal circuit 512 to a comparator circuit 534 comprising a plurality of operational amplifiers. Each of the operational amplifiers within the comparator circuit receives a preferably 200 hz. sawtooth signal from a ramp generator 536. In response thereto, the comparator circuit 534 generates a plurality of command signals for controlling the plurality of solenoids 518. These command signals are then amplified in an output amplifier circuit 538, and then applied to their respective solenoids 518 through a redundancy control network 540 comprising the output relay circuit 530, a fault monitor 542 and an output relay network 544. As seen in FIG. 12b, the redundancy control network 540 receives like signals from the redundant pump and motor control circuit 520'. Fault monitor 542 serves to connect pump and motor control circuit 520' into operation if the control circuit 520 or any portion thereof, becomes inoperable.

The pump and motor control circuit 520 also includes a fault monitor circuit 545, which monitors all outputs of the output amplifiers 536 and disables any appropriate pump or motor drive output to the solenoids 518 if a short circuit or open circuit occurs in any of the output amplifiers 536. The fault monitor circuit 542 automatically resets the system when the failure is corrected.

The controller 500 also includes a sequence retraction control circuit 546 which is connected to the vehicle instrument panel 512. Retraction control circuit 546 includes a suitable microprocessor 547 and associated program storage devices such as random access memory (RAM) and read only memory (ROM) (not shown), which receives various retraction switch inputs including "Raise," "Lower," "Loaded," "Unloaded," "Normal," "Select" and "City." The microprocessor 547 includes a control program stored in its associated ROM which provides suitable retraction commands to output amplifiers 548, which in turn controls how the wheel members, four on each side of the vehicle, are raised or lowered to accomplish the desired operation.

Controller 500 also includes a brake/steer control circuit 550 which facilitates control of vehicle steering while braking. Brake/steer control circuit 550 receives the "left" and "right" control signals from the steering wheel circuit 510, and compares this signal with the output of a preferably 12 hz. sawtooth signal from ramp generator 551 therein. These comparisons generate control signals for controlling the brake valve solenoids 552, such control signals being supplied thereto following amplification by output amplifiers 554. The brake/steer control circuit 550 also provides a brake lock function, through brake lock solenoids 556, when the steering wheel 510 circuit indicates that the steering wheel is rotated to its extreme left or right position.

The operation of the controller 500 of FIGS. 21a and 21b will now be described with respect to various positions of the selector switch 502. When the selector 502 is in the "Neutral" position, no commands signals are output from the output amplifiers 536 and thus the displacement of each pump is zero regardless of the steering wheel and accelerator pedal positions. When the selector switch 502 is moved to the "Forward" position, the left and right outputs from the steering wheel circuit 510 are connected via the switching circuit 532 to the comparator circuit 534 for the forward pump and motor solenoids. The associated operational amplifier in the comparator circuit 534 compare the voltage from the steering wheel circuit 510 to the sawtooth signal from the ramp generator 536. The output pulses from the operational amplifiers in the comparator circuit 534 are directly proportional to the voltages received from the steering wheel circuit 510 and the accelerator pedal circuit 512. Specifically, the greater the voltage, the longer the pulse width of the control signal. As the accelerator pedal is depressed, a voltage rise occurs through the steering circuit 510 to the amplifier of the pump and motor drive circuits. The first two-thirds of voltage rise will cause the pumps to stroke from 0 to 100 percent, and the last one-third of voltage rise will cause the motors to distroke to their minimum displacement. The output to the motor solenoids are inhibited to prevent the motors from distroking unless an enable signal is received from the motor tachometer circuits 506 and 508, which indicate the motors are turning at least 1,100 r.p.m. This feature provides maximum torque to the wheels while the vehicle 10 is accelerating below 1,100 r.p.m., regardless of accelerator pedal position.

With the steering wheel in its centered position, the voltages from the steering circuit are the same and the pulse width to both forward solenoids will be the same, causing the vehicle to go straight. Turning the steering wheel 510 will change these pulse widths pulse with, respectively, stroking or destroking the hydraulic pumps and motors, causing the vehicle to turn proportionally to the amount of steering wheel rotation. In the "Forward" mode of operation, the vehicle drive motors are protected from overspeeding by monitoring the motor tachometer outputs 506 and 508 and stroking the motor to maintain the motor at or below the maximum safe operating speed of preferably 3700 r.p.m.

The "Reverse" operation tells the controller 500 to signal the right and left pumps to pump in a reverse direction, making the vehicle 10 move backward when the accelerator pedal is depressed. Otherwise, the operation of the controller 500 is generally the same as discussed above with respect to the Forward position of the selector switch 502.

As discussed above, the pump and motor control circuit 520 includes a horsepower limiter circuit 522, which allows the vehicle to operate at maximum horsepower without overloading the engine, by controlling the amount of hydraulic horsepower available to drive the vehicle 10. Horsepower limiting is accomplished by controlling the hydraulic pump fluid to the vehicle drive system. In order to control the hydraulic pump flow, the input voltage to the accelerator pedal must be controlled. The amount of accelerator pedal control will pump up over a 50 second period when power is supplied to the controller 500. Thereafter, the accelerator pedal 512 will have full control over the system. If the engine r.p.m. drops below a predetermined point, which in a preferred embodiment of the invention is 2800 r.p.m., the output of the horsepower limiter circuit 522 to the accelerator pedal drops to lower the engine r.p.m. to approximately 2050 r.p.m., and then goes on lineraly tracking engine r.p.m. until a point is reached where no pump flow is available or until the engine r.p.m. is stabilized. After the engine has accelerated to its normal r.p.m. above the predetermined r.p.m. set point, the accelerator pedal control slowly ramps up and resumes normal control. The output of the engine tachometer 504 must be present to the horsepower limiter 522 before the vehicle accelerator pedal circuit 512 will function to drive the vehicle at maximum pump displacement at engine r.p.m.'s below the 2800 r.p.m. predetermined set point.

The motor tachometer inputs provided by the motor tachometers 506 and 508 are feedback signals which prevent the hydraulic motor from overspeeding while operating in a maximum r.p.m. If the vehicle 10 attempts to overspeed, causing the motor r.p.m. to exceed its safe operating limit, the motor tachometer feedback signals from the tachometers 506 and 508 detect the maximum motor r.p.m. and reduces the accelerator pedal voltage through the accelerator output circuit 528. By reducing accelerator pedal voltage, the hydraulic motors are stoked to a higher displacement, thereby reducing their r.p.m. When the overspeed condition is corrected, the motor will automatically destroke the position commanded by the accelerator pedal.

Figure 22:
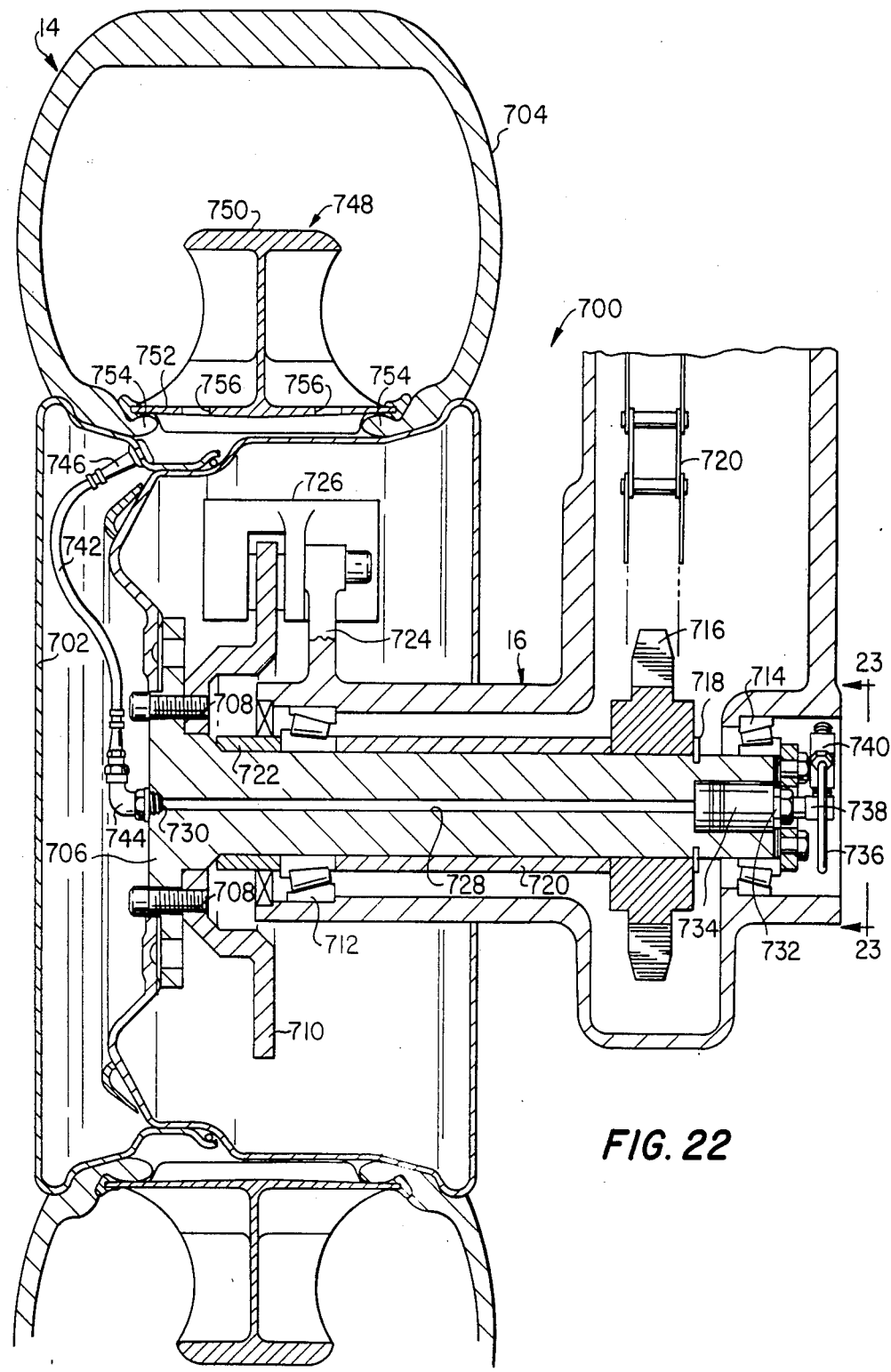
FIG. 22 is a sectional view of a wheel member and secondary frame of a vehicle incorporating the central tire inflation system of the present invention.

Referring now to FIG. 22, there is shown in cross section the construction of a tire inflation system 700 for a wheel member 14 of the vehicle 10. The wheel member 14 includes a rim 702 which supports a pneumatic tire 704. The rim 702, in turn, is attached to a hub 706 by means of a number of fasteners 708. The fasteners 708 also secure a disc brake 710 to the hub 706 and the rim 702 for concurrent rotation therewith.

The hub extends within a secondary frame 16 of the vehicle 10 and is rotatably supported therein by means of longitudinally spaced roller bearings 712 and 714. A drive gear 716 is secured to one end of the hub 706 between a snap ring 718 and a spacing collar 720. A drive chain 720 (partially illustrated) extends around the drive gear 716 to drive the wheel member 14. The drive chain 720 transmits torque to the drive gear 716 from a suitable transmission connected to the hydraulic motor of the vehicle 10. The spacing collar 720 is held against movement along the hub 706 by the roller bearing assembly 712, which in turn abuts another spacing collar 722. The secondary frame 16 includes a support flange 724 which supports a brake caliper 726. The brake caliper 726 can be selectively actuated by the braking control means of the vehicle 10 to engage the brake disc 710, thereby slowing rotation of the wheel member 14.

The hub 706 includes a conduit 728 which extends throughout its entire length and terminates in an outward port 730 and an inward port 732. The conduit 728 enlarges into a plenum 734 adjacent the inward port 732 thereof. The plenum 734 serves to reduce turbulence in the flow of gases through the conduit 728 from the inward port 734 to the outward port 730.

Figure 23:
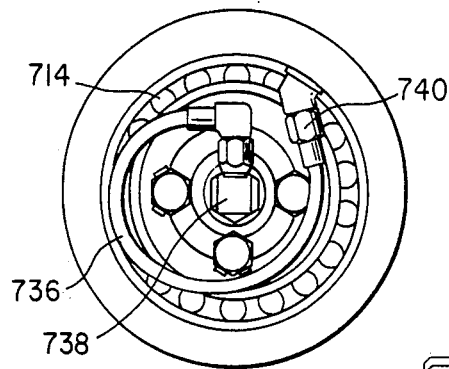
FIG. 23 is an end view of the wheel member and secondary frame shown in FIG. 22, taken along line 23—23.

Referring now to FIGS. 22 and 23, the inward port 732 of the conduit 728 is connected to a pneumatic tube 736 by means of a rotary coupling 738. The rotary coupling 738 allows the pneumatic tube 736 to remain fixed with respect to the secondary frame 16 as the hub 706 and wheel member 14 rotate. The pneumatic tube 736 is connected by a coupling to a supply port which extends through the wall of the secondary frame 16.

The outward port 730 of the conduit 728 is connected to a pneumatic line 742 by means of a coupling 744. The other end of the pneumatic line 742 is connected to a port in the rim 702 by means of a coupling 746. This configuration allows air to be added or removed from within the pneumatic tire 704 as the wheel member 14 rotates during operation of the vehicle 10.

The wheel member 14 includes a tire support 748 for supporting the tire 704 when deflated. The support 748 includes an upper surface 750 which supports the wheel member 14 in the event of deflation of the tire 704. The support 748 includes a support flange 752 which extends between and grips the opposing beads 754 and 756 of the tire 704 against the outer surface of the rim 702. A pair of apertures 756 extend through the support flange 752, thereby allowing communication between the air within the tire 704 and the coupling 746. The support 748 may be manufactured from hard rubber, steel or other suitable material.

Figure 24:
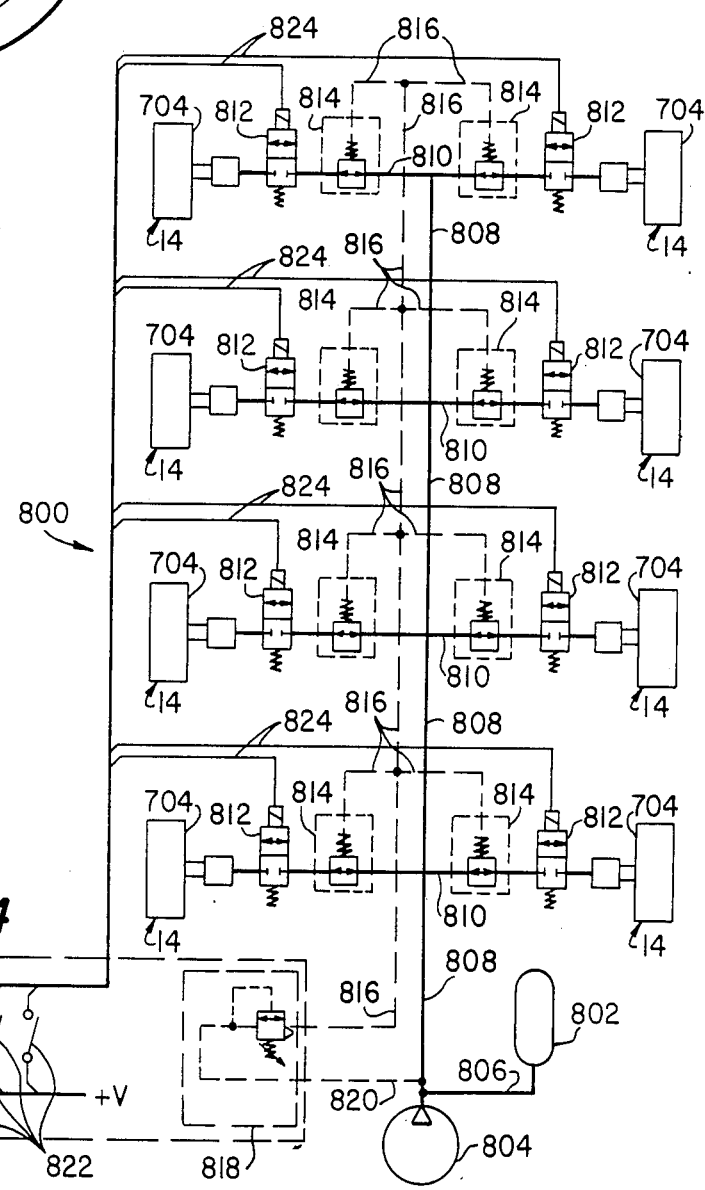
FIG. 24 is a schematic diagram of a pneumatic system for controlling the pressure with the tires of an adverse terrain vehicle.

FIG. 24 illustrates a tire inflation control system 800 which may be utilized to control the pressure within the pneumatic tires 704 of each wheel member 14 of the vehicle 10. Each of the wheel member 14 is equipped with the tire inflation system illustrated in FIGS. 21 and 22, allowing variation of the pressure of each pneumatic tire 704.

Pressurized air for the control system 800 is supplied from an accumulator 802 that is charged by a compressor (not shown). Pneumatic pressure from the accumulator 802 is supplied to a primary pressure regulator 804 via a pneumatic line 806. The primary regulator 804 is adjusted to maintain the pneumatic pressure applied to the remainder of this system via lines 808 and 810, as is desired.

A control valve 812 and a remote regulator 814 control the pressure and flow of air to each of the wheel members 14. The remote regulators 814 are pilot operated and regulate the pressure of air supplied to their respective wheel members 14 in response to the pneumatic pressure within the remote regulator control line 816. Pressure within the control line 816 is varied by a pilot regulator 818 which receives pressurized air from the line 808 via a line 820. The pilot regulator 818 is mounted on the control panel of the vehicle 10 and can therefore be adjusted by the vehicle operator to simultaneously vary the pressure of air supplied to all of the wheel members 14 through the remote regulators 814.

The control valves 812 are each positioned between their respective wheel members 14 and pilot regulators 814. The control valves 812 are solenoid actuated, spring return and are normally in the closed position, thereby disconnecting their respective wheel members 14 from their respective pilot regulators 814. When the solenoid of each control valve 812 is actuated, continuity is established between the respective wheel member 14 and pilot regulator 814, thereby allowing adjustment of the pressure within the associated tire 704.

Individual actuation of the control valves 812 is facilitated by providing a control switch 822 for each of the valves 812 on the control panel of the vehicle 10. When each of the switches 822 is closed, an electrical signal actuating its respective control valve 812 is transmitted via one a number of electrical lines 824. Thus, the pilot regulator 818 may be utilized to adjust the pressure within the tire 704 of any number of the wheel members 14 by actuating the appropriate switches 822. This feature also allows deactuation of the control valve 812 associated with any tire 704 which is punctured, thereby preventing loss of pressure within the system 800 and within the remaining tires 704.

The pressure control system 800 may also include a safety device for preventing actuation of the valves 812 until the accumulator 802 is raised to an operating pressure. This is particularly important since the compressor which charges the accumulator 802 will probably not be operating when the vehicle is idle. Therefore, timers, pressure switches and other devices may be used to prevent actuation of the control valves 812 until the accumulator 802 has reached its operating pressure. In addition, the safety device may include an interlock connected to the ignition of the vehicle which prevents actuation of the control valves 812 when the ignition is turned off, thereby preventing loss of pressure from within the tires 704.

Although preferred embodiments of the invention have been illustrated in the accompanying Drawings and have been described in the foregoing Detailed Description, it will be understood that the invention is not limited to the embodiments disclosed, but is capable of numerous rearrangements, modifications and substitution of parts and elements without departing from the spirit of the invention.

We claim:

1. An adverse terrain vehicle having a frame with at least three wheel members rotatably mounted on each side thereof comprising:
- at least two variable displacement hydraulic motors mounted on the frame each for driving at least one wheel member on one side of the vehicle independently of the wheel members on the opposing side of the vehicle;
- at least two variable displacement hydraulic pumps mounted on the vehicle for supplying pressurized hydraulic fluid to the hydraulic motor on one side of the vehicle independently of the hydraulic motor on the opposing side of the vehicle;
- at least one prime mover for driving the hydraulic pumps;
- overload sensing means for sensing a decrease in the power output of the vehicle below a selected power output;
- overload protection means responsive to the overload sensing means for increasing the displacement of the hydraulic motors and for decreasing the displacement of the hydraulic pumps, thereby increasing the power output capacity of the vehicle;
- steering means for directing movement of the vehicle along a selected path, including means for adjusting the speed of the hydraulic motor on at least one side of the frame to effect turning of the vehicle;
- braking means response to the steering means for selectively applying braking forces to the wheel members on opposite sides of the vehicle to reduce the velocity of the vehicle along the selected path and simultaneously turning the vehicle during braking as determined by the steering means;
- wheel member positioning means for selectively vertically positioning the wheel members on each side of the vehicle relative to the frame;
- means for sensing the speed of the hydraulic motor on each side of the vehicle;
- motor control means responsive to the motor speed sensing means for varying the displacement of the hydraulic motor on each side of the vehicle as the motor speed exceeds a predetermined value and as the motor speed drops below a lower predetermined value;
- means responsive to the steering means for adjusting the displacement of at least one of the hydraulic pumps to effect turning of the vehicle when the vehicle is slowing or coasting; and
- wherein the overload control means decreases the displacement of the hydraulic motors and increases the displacement of the hydraulic pumps over a predetermined time interval following return of the power output capacity of the vehicle above a predetermined point.

2. An adverse terrain vehicle having a frame with at least three wheel members rotatably mounted on each side thereof comprising:
- at least two variable displacement hydraulic motors mounted on the frame each for driving at least one wheel member on one side of the vehicle independently of the wheel members on the opposing side of the vehicle;
- at least two variable displacement hydraulic pumps mounted on the vehicle for supplying pressurized hydraulic fluid to the hydraulic motor on one side of the vehicle independently of the hydraulic motor on the opposing side of the vehicle;
- at least one prime mover for driving the hydraulic pumps;
- overload sensing means for sensing a decrease in the power output of the vehicle below a selected power output;
- overload protection means responsive to the overload sensing means for increasing the displacement of the hydraulic motors and for decreasing the displacement of the hydraulic pumps, thereby increasing the power output capacity of the vehicle;
- steering means for directing movement of the vehicle along a selected path, including means for adjusting the speed of the hydraulic motor on at least one side of the frame to effect turning of the vehicle;
- braking means response to the steering means for selectively applying braking forces to the wheel members on opposite sides of the vehicle to reduce the velocity of the vehicle along the selected path and simultaneously turning the vehicle during braking as determined by the steering means;
- wheel member positioning means for selectively vertically positioning the wheel members on each side of the vehicle relative to the frame;
- means for sensing the speed of the hydraulic motor on each side fo the vehicle;
- motor control means responsive to the motor speed sensing means for varying the displacement of the hydraulic motor on each side of the vehicle as the motor speed exceeds a predetermined value and as the motor speed drops below a lower predetermined value;
- means responsive to the steering means for adjusting the displacement of at least one of the hydraulic pumps to effect turning of the vehicle when the vehicle is slowing or coasting;
- wherein the braking means applies a braking force to one or more of the wheel members on each side of the vehicle in proportion to the degree of braking selected within a predetermined range of braking forces;
- wherein the braking means reduced the braking force applied to the wheel members on the outside of a selected turn during braking in response to the steering means thereby directing the path of vehicle travel; and
- wherein the braking means reduces the braking force applied to the wheel members on the outside of a selected turn by pulsating the braking force applied to the wheel members on the outside of the selected turn.

3. An adverse terrain vehicle having a frame with at least three wheel members rotatably mounted on each side thereof comprising:
- at least two variable displacement hydraulic motors mounted on the frame each for driving at least one wheel member on one side of the vehicle independently of the wheel members on the opposing side of the vehicle;
- at least two variable displacement hydraulic pumps mounted on the vehicle for supplying pressurized hydraulic fluid to the hydraulic motor on one side of the vehicle independently of the hydraulic motor on the opposing side of the vehicle;
- at least one prime move for driving the hydraulic pumps;
- overload sensing means for sensing a decrease in the power output of the vehicle below a selected power output;

overload protection means responsive to the overload sensing means for increasing the displacement of the hydraulic motors and for decreasing the displacement of the hydraulic pumps, thereby increasing the power output capacity of the vehicle;

steering means for directing movement of the vehicle along a selected path, including means for adjusting the speed of the hydraulic motor on at least one side of the frame to effect turning of the vehicle;

braking means response to the steering means for selectively applying braking forces to the wheel members on opposite sides of the vehicle to reduce the velocity of the vehicle along the selected path and simultaneously turning the vehicle during braking as determined by the steering means;

wheel member positioning means for selectively vertically positioning the wheel members on each side of the vehicle relative to the frame;

means for sensing the speed of the hydraulic motor on each side fo the vehicle;

motor control means responsive to the motor speed sensing means for varying the displacement of the hydraulic motor on each side of the vehicle as the motor speed exceeds a predetermined value and as the motor speed drops below a lower predetermined value;

means responsive to the steering means for adjusting the displacement of at least one of the hydraulic pumps to effect turning of the vehicle when the vehicle is slowing or coasting; and wherein the wheel member positioning means includes one or more hydraulic cylinders for extending and retracting each wheel member, wherein the wheel member positioning means further includes means for applying substantially uniform pulses of hydraulic fluid to each cylinder to position the wheel member associated therewith, and wherein the placement of each cylinder is determined by the number of pulses of hydraulic fluid applied thereto.

4. The vehicle according to claim 3 wherein the wheel member positioning means extends or retracts a plurality of the wheel members concurrently by sequentially applying pulses of hydraulic fluid to the cylinders associated with the plurality of wheel members, whereby the plurality of cylinders are extended or retracted in sequential incremental lengths.

5. An adverse terrain vehicle having a frame with at least two wheel members rotatably mounted on each side thereof comprising:

at least two variable displacement hydraulic motors mounted on the frame each for driving at least one wheel member on one side of the vehicle independently of the wheel members on the opposing side of the vehicle;

at least two variable displacement hydraulic pumps mounted on the vehicle for supplying pressurized hydraulic fluid to the hydraulic motor on one side of the vehicle independently of the hydraulic motor on the opposing side of the vehicle;

at least one prime mover for driving the hydraulic pumps;

overload sensing means for sensing a decrease in the power output of the vehicle below a selected power output;

overload protection means responsive to the overload sensing means for increasing the power output capacity of the vehicle by varying the displacement of at least one of the pumps and motors; and wherein the overload protection means first increases the displacement of the hydraulic motors and thereafter decreases the displacement of the hydraulic pumps in response to the overload sensing means.

6. The vehicle according to claim 5 wherein the overload protection means adjusts the displacement of the hydraulic motors and pumps in response to the overload sensing means proportionately with respect to a decrease in the speed of the prime mover means below a selected speed.

7. An adverse terrain vehicle having a frame with at least two wheel members rotatably mounted on each side thereof comprising:

at least two variable displacement hydraulic motors mounted on the frame each for driving at least one wheel member on one side of the vehicle independently of the wheel members on the opposing side of the vehicle;

at least two variable displacement hydraulic pumps mounted on the vehicle for supplying pressurized hydraulic fluid to the hydraulic motor on one side of the vehicle independently of the hydraulic motor on the opposing side of the vehicle;

at least one prime mover for driving the hydraulic pumps;

overload sensing means for sensing a decrease in the power output of the vehicle below a selected power output;

overload protection means responsive to the overload sensing means for increasing the power output capacity of the vehicle by varying the displacement of at least one of the pumps and motors; and pump and motor control means for varying the displacement of the pumps and motors in response to variation of the selected power output, wherein the pump and motor control means first increases the displacement of the pumps and then decreases the displacement of the motors as the selected power output increases from a predetermined minimum value to a predetermined maximum value.

8. The vehicle according to claim 7 further comprising motor speed sensing means for determining and transmitting an indication of the speed of each motor to the motor and pump control means, wherein the motor and pump control means holds the motors at their maximum displacement below a predetermined motor speed, thereby facilitating acceleration of the vehicle at slow speeds.

9. The vehicle according to claim 7 further comprising steering means for varying the displacement of the hydraulic pumps on either side of the vehicle in opposing directions from the displacements set by the pump and motor control means to adjust the speed of the hydraulic motors to effect turning of the vehicle.

10. An adverse terrain vehicle having a frame with at least two wheel members rotatably mounted on each side thereof comprising:

at least two motor means mounted on the frame each for driving at least one wheel member on one side of the vehicle independently of the wheel members on the opposing side of the vehicle;

steering means for directing movement of the vehicle along a selected path, including means for adjusting the speed of the motor means on at least one side of the frame to effect turning of the vehicle;

braking means responsive to the steering means for selectively applying braking forces to the wheel members on opposite sides of the vehicle to reduce the velocity of the vehicle along the selected path and simultaneously turning the vehicle during braking as determined by the steering means, wherein the braking means applies a braking force to one or more of the wheel members on each side of the vehicle in proportion to the degree of braking selected within a predetermined range of braking forces;

wherein the braking means reduces the braking force applied to the wheel members on the outside of a selected turn during braking in response to the steering means thereby directing the path of vehicle travel; and wherein the braking means reduces the braking force applied to the wheel members on the outside of a selected turn by pulsating the braking force applied to the wheel members on the outside of the selected turn.

11. The vehicle according to claim 10 wherein the braking means varies the duration of the braking force pulsations to produce a reduced effective braking force in response to the vehicle turn radius determined by the steering means.

12. An adverse terrain vehicle having a frame with at least three wheel members rotatably mounted on each side thereof comprising:

at least two motor means mounted on the frame each for driving at least one wheel member on one side of the vehicle independently of the wheel members on the opposing side of the vehicle;

steering means for directing movement of the vehicle along a selected path, including means for adjusting the speed of the motor means on at least one side of the frame to effect turning of the vehicle; and wheel member positioning means for selectively vertically positioning the wheel members on each side of the vehicle relative to the frame, including one or more hydraulic cylinders for extending and retracting each wheel member, wherein the wheel member positioning means further includes means for applying substantially uniform pulses of hydraulic fluid to each cylinder to position the wheel member associated therewith, and wherein the placement of each cylinder is determined by the number of pulses of hydraulic fluid applied thereto.

13. The vehicle according to claim 12 wherein the wheel member positioning means extends and retracts a plurality of the wheel members concurrently by sequentially applying pulses of hydraulic fluid to the cylinders associated with the plurality of wheel members, whereby the plurality of cylinders are extended or retracted in sequential incremental lengths.

14. The vehicle according to claim 13 wherein the wheel member positioning means includes at least one valve for regulating the pulses of hydraulic fluid applied to each cylinder and wherein the wheel member positioning means actuates each of the valves for a predetermined time interval to apply each pulse of hydraulic fluid.

15. The vehicle according to claim 14 wherein the wheel member positioning means includes means for supplying pressurized hydraulic fluid to the valves and pressure detection means for sensing a reduction in hydraulic pressure upstream of each of the valves and wherein the wheel member positioning means ceases actuation of any valve in response to an indication from the pressure detection means that pressure upstream of the valve has not fluctuated upon actuation of the valve, whereby the valve will not be actuated once the associated cylinder has been fully extended or retracted.

16. The vehicle according to claim 12 wherein the wheel member positioning means positions the wheel members according to a plurality of selectable operating modes including a first operating mode for fully lowering all wheel members relative to the frame.

17. The vehicle according to claim 16 wherein the wheel member positioning means includes a second operating mode for at least partially raising the endmost wheel members relative to the frame.

18. The vehicle according to claim 17 wherein the wheel member positioning means raises the endmost wheel members in response to initiation of a vehicle turn by the steering means.

19. The vehicle according to claim 16 wherein the wheel member positioning means includes a third operating mode for individually adjusting the positions of each of the wheel members relative to the frame.

20. The vehicle according to claim 16 wherein the wheel member positioning means includes a fourth operating mode for concurrently lowering and raising all of the wheel members.

21. The vehicle according to claim 16 wherein the wheel member positioning means includes a fifth operating mode for lowering the wheel members on one side of the vehicle and raising the wheel members on the other side of the vehicle to tilt the vehicle laterally.

22. The vehicle according to claim 16 wherein the wheel member positioning means includes a sixth operating mode for lowering and raising the wheel members to tilt the vehicle longitudinally.

* * * * *